US008449652B2

(12) United States Patent
Radosz et al.

(10) Patent No.: US 8,449,652 B2
(45) Date of Patent: May 28, 2013

(54) POLY(IONIC LIQUID)S AS NEW MATERIALS FOR $CO_2$ SEPARATION AND OTHER APPLICATIONS

(75) Inventors: Maciej Radosz, Laramie, WY (US); Youqing Shen, Laramie, WY (US)

(73) Assignee: University of Wyoming, Laramie, WY (US)

( * ) Notice: Subject to any disclaimer, the term of this patent is extended or adjusted under 35 U.S.C. 154(b) by 994 days.

(21) Appl. No.: 11/659,484

(22) PCT Filed: Aug. 5, 2005

(86) PCT No.: PCT/US2005/027833
§ 371 (c)(1),
(2), (4) Date: Dec. 11, 2008

(87) PCT Pub. No.: WO2006/026064
PCT Pub. Date: Mar. 9, 2006

(65) Prior Publication Data
US 2009/0266230 A1  Oct. 29, 2009

Related U.S. Application Data

(60) Provisional application No. 60/599,118, filed on Aug. 5, 2004.

(51) Int. Cl.
*B01D 53/22* (2006.01)
*B01D 53/02* (2006.01)
(52) U.S. Cl.
USPC ............ 95/51; 95/92; 95/139; 96/4; 96/153

(58) Field of Classification Search
USPC ............... 95/51, 92, 236, 139, 148; 528/289, 528/394; 502/402
See application file for complete search history.

(56) References Cited

U.S. PATENT DOCUMENTS

| | | | |
|---|---|---|---|
| 7,208,605 B2* | 4/2007 | Davis, Jr. ............... | 548/110 |
| 7,585,415 B2* | 9/2009 | Wyse et al. .............. | 210/639 |
| 2005/0119431 A1* | 6/2005 | Schmidt .................. | 526/258 |
| 2006/0049102 A1* | 3/2006 | Miller et al. ............. | 210/500.27 |

OTHER PUBLICATIONS

"Highly ion conductive flexible films composed of network polymers based on polymerizable ionic liquids", Satoko Washiro et al, J. of Polymer, Jan. 2004.*
"Highly ion conductive flexible films composed of network polymers based on polymerizable ionic liquids", Washiro et al, Polymer, 45 2004, 1577-1582.*

(Continued)

*Primary Examiner* — Duane Smith
*Assistant Examiner* — Ives Wu
(74) *Attorney, Agent, or Firm* — Davis, Brown, Koehn, Shors & Roberts, P.C.; Kent A. Herink

(57) ABSTRACT

Polymerizable ionic liquid monomers and their corresponding polymers (poly(ionic liquid)s) are created and found to exhibit high $CO_2$ sorption. The poly(ionic liquid)s have enhanced and reproducible $CO_2$ sorption capacities and sorption/desorption rates relative to room-temperature ionic liquids. Furthermore, these materials exhibit selectivity relative to other gases such as nitrogen, methane, and oxygen. They are useful as efficient separation agents, such sorbents and membranes. Novel radical and condensation polymerization approaches are used in the preparation of the poly(ionic liquids).

3 Claims, 11 Drawing Sheets

OTHER PUBLICATIONS

Tang, Jianbin, et al.; Poly(ionic liquid)s as new materials for CO2 absorption; Journal of Polymer Science Part A: Polymer Chemistry; 2005, ScholarOne, Charlottesville, Virginia, US.

Tang, Jianbin et al.; Low-pressure CO2 sorption in ammonium-based poly(ionic liquid)s; Polymer 46 (2005) 12460-12467; Elsevier Ltd., available online at www.sciencedirect.com.

Tang, Jianbin, et al.; Enhanced CO2 Absorption of Poly(ionic liquid)s; Macromolecules 2005, 38, 2037-2039; American Chemical Society; published on the web Feb. 18, 2005.

Tang, Jianbin, et al.; Poly(ionic liquid)s: a new material with enhanced and fast CO2 absorption; ChemComm 205, 3325-3327; The Royal Society of Chemistry.

* cited by examiner

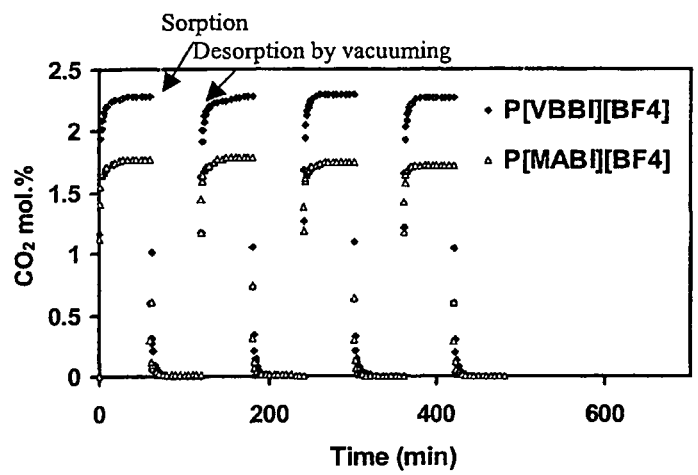
a
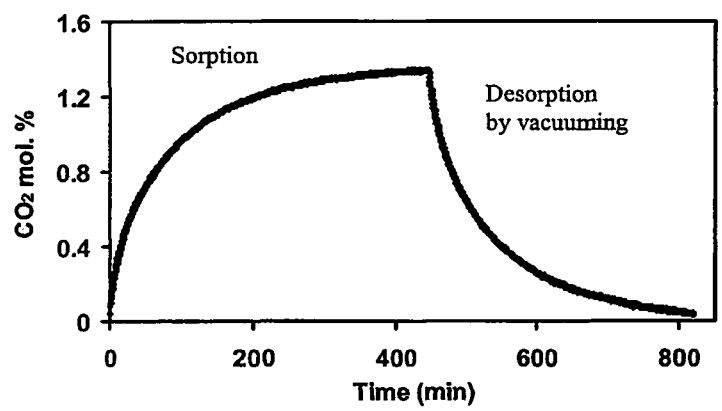
b
FIGS. 8

FIGS. 9A, B

POLY(IONIC LIQUID)S AS NEW MATERIALS FOR $CO_2$ SEPARATION AND OTHER APPLICATIONS

BACKGROUND OF THE INVENTION

The invention relates generally to novel materials, namely polymers made from ionic liquids, referred to herein as poly (ionic liquid)s, and, more specifically, to poly(ionic liquid)s for separating gases, particularly carbon dioxide ($CO_2$).

Global warming resulting from the increased $CO_2$ concentration in the atmosphere due to emissions of $CO_2$ from fossil fuel combustion is becoming one of most important environmental issues.[1,2] Recently, $CO_2$ capture and sequestration are receiving significant attention. For carbon sequestration, because the cost of capture and separation are estimated to make up three-fourths of total costs of ocean or geologic sequestration, it is important to develop new materials and methods to separate and capture $CO_2$ from flue gas[3,4,5] and other gas mixtures.

Ionic liquids, which are organic salts that become liquids usually below about 200° C., have attracted attention because of their unique chemical and physical properties and wide application potentials.[6-12] Recently, $CO_2$ was found to be remarkably soluble in ionic liquids, and thus ionic liquids have been explored as non-volatile, and reversible absorbents for $CO_2$ separation.[13-21] For instance, at 15 bar of $CO_2$ pressure, the $CO_2$ solubility in 1-butyl-3-methylimidazolium hexafluorophosphate ([bmim][$PF_6$]) is about 23 mol. %.[19] The $CO_2$ solubility in the ionic liquids is dependent on their cations and substituents, and especially on their anions.[19] For example, fluorine-containing anions (e.g. bis(trifluoromethyl-sulfonyl)imide, $Tf_2N$),[19] or cations,[22] or amine groups[23] tend to increase the $CO_2$ solubility. Ionic liquids have also been impregnated into porous materials for developing supported liquid membranes. Such membranes have high $CO_2$ selectivity and permeance because of the selective sorption of $CO_2$ in ionic liquids.[24-26]

We have found that poly(ionic liquid)s, the polymers prepared from ionic liquid monomers, have higher $CO_2$ sorption capacity than room temperature ionic liquids. Most importantly, the $CO_2$ sorption and desorption of the polymers are much faster than those of ionic liquids and the sorption/desorption is completely reversible. These poly(ionic liquid)s are thus promising as sorbent and membrane materials for $CO_2$ separation.

SUMMARY OF THE INVENTION

The invention consists of a class of new materials consisting of novel ionic liquids and polymers made from ionic liquids. The poly(ionic liquid)s are polymerized ionic liquid monomers and have been found to have a $CO_2$ absorption rate and/or a $CO_2$ absorption capacity higher than that of the ionic liquid monomer. Certain of the poly(ionic liquid)s have a $CO_2$ absorption capacity almost ten times that of the ionic liquid monomer from which they are made. The sorption/desorption rates of the poly(ionic liquid)s are much faster than those of the corresponding ionic liquid monomers, and the poly(ionic liquid)s retain their sorption/desorption properties after going through sorption/desorption cycling. The polymers are made primarily through radical polymerization, but other methods of polymerization may also be used.

The ionic liquid monomers include: (a) Imidazolium-based ionic liquids, such as (a) 1-[2-(methacryloyloxy) ethyl]-3-butyl-imidazolium tetrafluoroborate ([MABI][$BF_4$]), 1-(p-vinylbenzyl)-3-butyl-imidazolium tetrafluoroborate ([VBBI][$BF_4$]), 1-(p-vinylbenzyl)-3-methyl-imidazolium tetrafluoroborate [VBMI][$BF_4$], 1-(p-vinylbenzyl)-3-butyl-imidazolium hexafluorophosphate [VBBI][$PF_6$], 1-(p-vinylbenzyl)-3-butyl-imidazolium o-benzoic sulphimide ([VBBI][Sac]), 1-p-vinylbenzyl)-3-butyl-imidazolium trifluoromethane sulfonamide([VBBI][$BF_4$]), and (1-butylimidazolium-3)methyl-ethylene oxide ([BIEO][$BF_4$]); (b) Ammonium-based ionic liquids, such as p-vinylbenzyl)trimethyl ammonium tetrafluoroborate ([VBTMA][$BF_4$]), (p-vinylbenzyl)triethyl ammonium tetrafluoroborate ([VBTEA][$BF_4$]), (p-vinylbenzyl)tributyl ammonium tetrafluoroborate ([VBTBA][$BF_4$]), 2-(methacryloyloxy)ethyltrimethylammonium tetrafluoroborate ([MATMA][$BF_4$]), (p-vinylbenzyl)trimethyl ammonium hexafluorophosphate ([VBTMA][$PF_6$]), (p-vinylbenzyl)trimethyl ammonium o-benzoic sulphimide ([VBTMA][Sac]), and (p-vinylbenzyl)trimethyl ammonium trifluoromethane sulfonamide ([VBTMA][$Tf_2N$]); (c) Phosphonium-based ionic liquids, such as p-vinylbenzyl)triethyl phosphonium tetrafluoroborate ([VBTEP][$BF_4$]), and (p-vinylbenzyl) triphenyl phosphonium tetrafluoroborate ([VBTPP][$BF_4$]); (d) Pyridinium-based ionic liquids, such as 1-(p-vinylbenzyl) pyridinium tetrafluoroborate ([VBP][$BF_4$]); and (e) Condensation polymerization ionic monomers, such as bis(2-hydroxyethyl)dimethyl ammonium tetrafluoroborate ([BHEDMA][$BF_4$]), 2,2-bis(methylimidazolium methyl)-1, 3-propanediol tetrafluoroborate ([BMIMP][$BF_4$]), and 2,2-bis(butylimidazolium methyl)-1,3-propanediol tetrafluoroborate ([BBIMP][$BF_4$]).

The invention also consists of a process for the separation and recovery of gases that are soluble in the ionic liquid monomers and have sorption capacities and/or rates in the poly(ionic liquid)s that are higher than those in the corresponding ionic liquid monomer. In the specific example of $CO_2$, the process includes the steps of contacting a $CO_2$-containing gas mixture with a solid sorbent that includes at least one poly(ionic liquid) compound under such conditions as to obtain a gas product having a lower concentration of $CO_2$ than the initial gas mixture and a solid sorbent containing absorbed carbon dioxide which has been removed from said gas mixture. Preferably, the solid sorbent is treated under conditions as to substantially desorb the $CO_2$ contained in the solid sorbent so as to obtain a regenerated solid sorbent.

BRIEF DESCRIPTION OF THE FIGURES

FIG. 8 is a graphical representation of the (a) cycles of $CO_2$ sorption (592.3 mmHg $CO_2$, 22° C.) and desorption of P[VBBI][$BF_4$] and P[MABI][$BF_4$] under vacuum; (b) $CO_2$ sorption (592.3 mmHg $CO_2$, 22° C.) and desorption of a typical ionic liquid [bmim][$BF_4$] under vacuum.

DETAILED DESCRIPTION OF PREFERRED EMBODIMENTS

Figure 1:
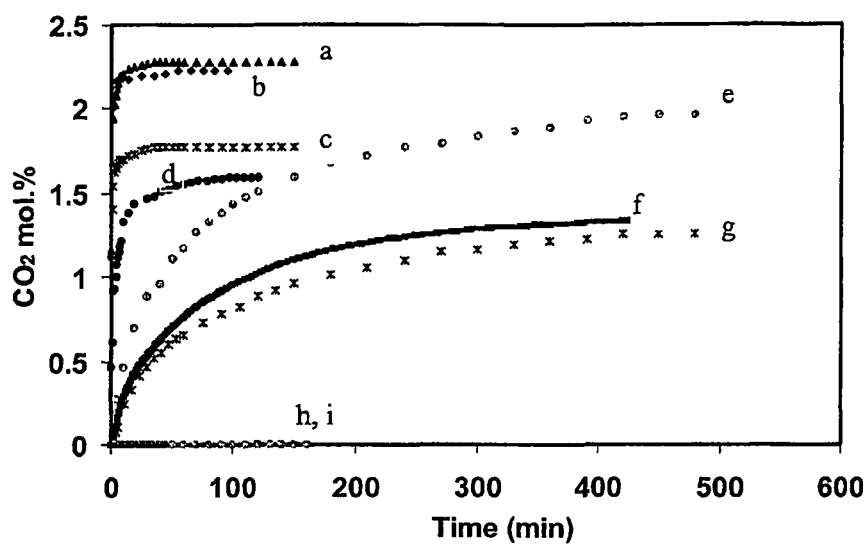
FIG. 1 is a graphical representation of the $CO_2$ sorption of the poly(ionic liquids)s (P[VBBI][$BF_4$](a), P[VBBI][$Tf_2N$] (b), P[MABI][$BF_4$](c), P[VBBI][Sac](d)), with their corresponding monomers ([VBBI][$Tf_2N$](e), [MABI][$BF_4$](g), [VBBI][$BF_4$](h), [VBBI][Sac](i)), and an ionic liquid [bmim][$BF_4$] (f) as a function of time (592.3 mmHg $CO_2$, 22° C.).

In this description, each material is introduced by its full chemical name followed by a shortened name in parenthesis, for example, 1-[2-(methacryloyloxy)ethyl]-3-butyl-imidazolium tetrafluoroborate ([MABI][$BF_4$]). Following the initial introduction, only the shortened name is used.

Ionic liquids are organic salts with melting points usually below 200° C., often below room temperature. They can be substitutes for the traditional organic solvents in chemical reactions. The most common examples are imidazolium and pyridinium derivatives, but phosphonium or tetralkylammonium compounds have also been explored.

Ionic liquid monomers of the present application are ionic liquids that are suitable for polymerization of the ionic liquid monomers to form poly(ionic liquid)s. Specific examples of ionic liquid monomers of the present application have a double bond that forms a radical when broken. The ionic liquid monomers may include an inorganic moiety. Specific examples of ionic liquid monomers used for polymer synthesis and other applications include but are not limited to:

(1) Ionic liquid monomers based on imidazolium, such as 1-[2-(methacryloyloxy)ethyl]-3-butyl-imidazolium tetrafluoroborate ([MABI][$BF_4$]), 1-p-vinylbenzyl)-3-butyl-imidazolium tetrafluoroborate ([VBBI][$BF_4$]), 1-(p-vinylbenzyl)-3-methyl-imidazolium tetrafluoroborate ([VBMI][$BF_4$]), 1-(p-vinylbenzyl)-3-butyl-imidazolium hexafluorophosphate ([VBBI][$PF_6$]), 1-(p-vinylbenzyl)-3-butyl-imidazolium o-benzoic sulphimide ([VBBI][Sac]), 1-(p-vinylbenzyl)-3-butyl-imidazolium trifluoromethane sulfonamide([VBBI][$BF_4$]), (1-butylimidazolium-3)methyl-ethylene oxide ([BIEO][$BF_4$]);

(2) Ionic liquid monomers based on ammonium, such as (p-vinylbenzyltrimethyl) ammonium tetrafluoroborate ([VBTMA][$BF_4$]), (p-vinylbenzyl)triethyl ammonium tetrafluoroborate ([VBTEA][$BF_4$]), p-vinylbenzyl)tributyl ammonium tetrafluoroborate ([VBTBA][$BF_4$]), [2-(methacryloyloxy)ethyl]trimethyl ammonium tetrafluoroborate ([MATMA][$BF_4$]), (p-vinylbenzyl)trimethyl ammonium hexafluorophosphate ([VBTMA][$PF_6$]), p-vinylbenzyl)trimethyl ammonium o-benzoic sulphimide ([VBTMA][Sac]), (p-vinylbenzyltrimethyl) ammonium trifluoromethane sulfonamide ([VBTMA][$Tf_2N$]);

(3) Ionic liquid monomers based on phosphonium, such as (p-vinylbenzyl)triethyl phosphonium tetrafluoroborate ([VBTEP][$BF_4$]), (p-vinylbenzyl)triphenyl phosphonium tetrafluoroborate ([VBTPP][$BF_4$]);

(4) Ionic liquid monomers based on pyridinium, such as 1-(p-vinylbenzyl)pyridinium tetrafluoroborate ([VBP][$BF_4$]);

(5) Ionic liquid monomers for condensation polymerization, such as bis(2-hydroxyethyl)dimethyl ammonium tetrafluoroborate ([BHEDMA][$BF_4$]), 2,2-bis(methylimidazolium methyl)-1,3-propanediol tetrafluoroborate ([BMIMP][$BF_4$]), and 2,2-bis(butylimidazolium methyl)-1,3-propanediol tetrafluoroborate ([BBIMP][$BF_4$]).

Poly(ionic liquid)s as used in this specification means polymers formed using ionic liquids as monomers via radical polymerization or other kind of polymerization. Certain of the poly(ionic liquid)s have a gas sorption capacity and/or rate that is greater than that of the corresponding ionic liquid monomer for the corresponding gas.

Radical polymerization is a common and useful reaction for making polymers from vinyl monomers, that is, from small molecules containing carbon-carbon double bonds. Polymers made by radical polymerization include polystyrene, poly(methyl methacrylate), poly(vinyl acetate) and branched polyethylene. Radical polymerization begins with a molecule called an initiator; common initiators are benzoyl peroxide or 2,2'-azo-bis-isobutyrylnitrile (AIBN).

EXAMPLE 1

Materials

4-Vinylbenzyl chloride, methacryloyl chloride, 1-butylimidazole, 2-bromoethanol, lithium trifluoromethane sulfonimide, potassium hexafluorophosphate, sodium tetrafluoroborate, 2,6-di-tert-butyl-4-methyl phenol (DBMP), 2,2'-azobisisobutyronitrile (AIBN), aluminum isopropoxide, epichlorohydrin, N,N-dimethylformamide (DMF), acetonitrile, and acetone were purchased from Aldrich. 1-Methylimidazole, and o-benzoic sulphimide sodium salt hydrate were purchased from Lancaster Synthesis Inc. These chemicals were used without further purification.

Synthesis and Characterization

1-[2-(Methylacryloyloxy)ethyl]-3-butyl-imidazolium tetrafluoroborate ([MABI][BF$_4$]) and 1-(p-vinylbenzyl)-3-butyl-imidazolium tetrafluoroborate ([VBBI][BF$_4$]) were synthesized according to our published reports,[27,28] as shown in Schemes 1 and 2. 1-(p-Vinylbenzyl)-3-butyl-imidazolium hexafluorophosphate ([VBBI][PF$_6$]), 1-(p-vinylbenzyl)-3-butyl-imidazolium o-benzoic sulphimide ([VBBI][Sac]), 1-(p-vinylbenzyl)-3-butyl-imidazolium trifluoromethane sulfonamide ([VBBI][Tf$_2$N]) were synthesized by a similar procedure except using NaPF$_6$, o-benzoic sulphimide sodium salt hydrate (NaSac) or lithium trifluoromethane sulfonamide (LiTf$_2$N) for anion exchange reactions. The yields were 93.0%, 49.6%, 39.9%, respectively.

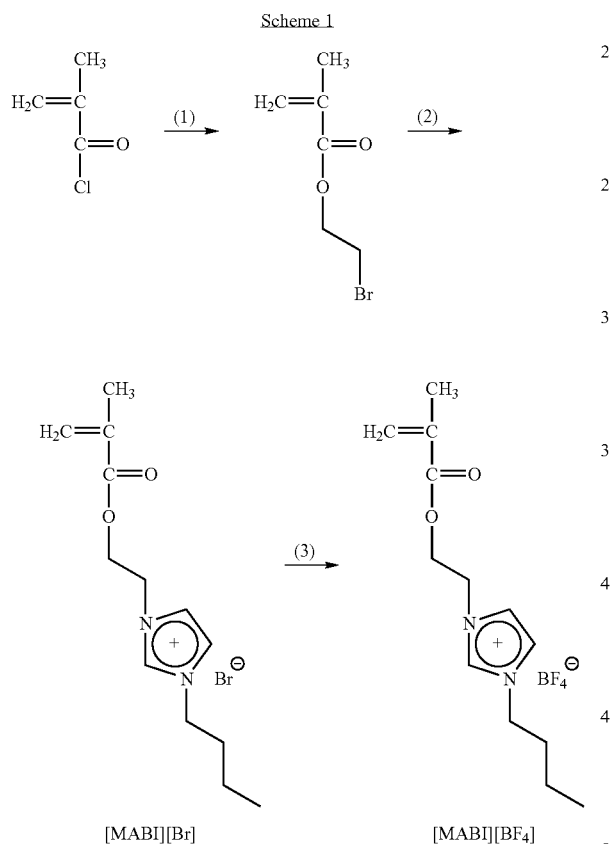

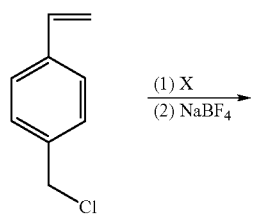

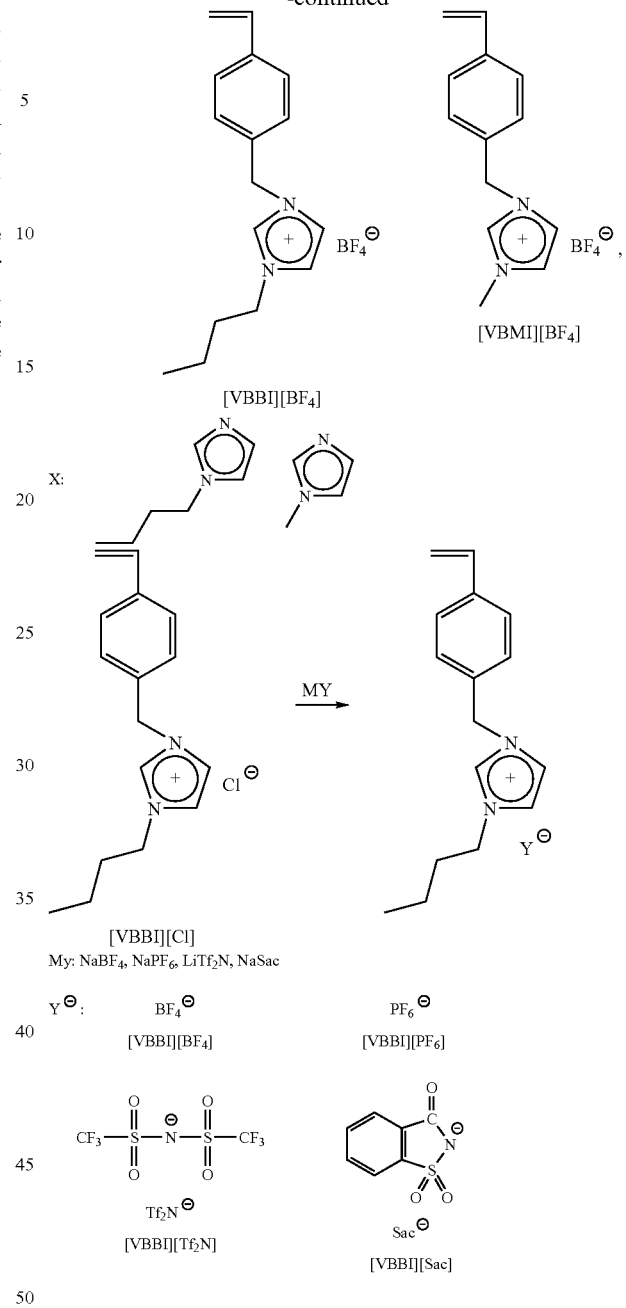

1-p-Vinylbenzyl)-3-methyl-imidazolium tetrafluoroborate ([VBMI][BF$_4$]) was synthesized as follows: To a 50 ml flask, p-vinylbenzyl chloride (10 ml, 0.064 mole), a small amount of DBMP, and 1-methylimdazole (5.14 ml, 0.064 mole) were added and heated at 45° C. overnight. The solution became gradually viscous. NaBF$_4$ (5.2 g, 0.47 mole) and dry acetone (30 ml) were added. The mixture was stirred at room temperature. The viscous liquid dissolved gradually while a white solid precipitated. After 12 h reaction, the precipitate was removed by filtration. The solvent was removed under vacuum. The solid was washed with water and ether, and dried by vacuuming at room temperature, producing 14 g of white crystals (yield 76.5%).

[VBBI][BF$_4$]: $^1$H NMR (400 MHz, DMSO-d$_6$, ppm): δ 9.24 (1H, s), 7.80 (2H, s), 7.51 (2H, d) 7.35 (2H, d), 6.73 (1H, m), 5.89 (1H, d) 5.27 (1H, d), 5.40 (2H, s), 4.14 (2H, t), 1.78 (2H, m), 1.24 (2H, m), 0.88 (3H, t). mp: 67-68° C.

[VBBI][PF$_6$] $^1$H NMR (400 MHz, DMSO-d$_6$, ppm): δ 9.22 (1H, s), 7.80 (2H, s), 7.48 (2H, d) 7.35 (2H, d), 6.73 (1H, m), 5.89 (1H, d), 5.30 (1H, d), 5.46 (2H, s), 4.14 (2H, t), 1.79 (2H, m), 1.22 (2H, m), 0.87 (3H, t). mp: 87-88.5° C.

[VBBI][Sac] $^1$H NMR (400 MHz, DMSO-d$_6$, ppm) δ 9.38 (1H, s), 7.80 (2H, s) 7.66 (1H, d), 7.61 (1H, d), 7.59 (2H, d), 7.49 (2H, d), 7.40 (2H, d), 6.72 (1H, m) 5.84 (1H, d), 5.42 (2H, s), 5.26 (2H, d) 4.16 (2H, m) 1.73 (2H, m), 1.21 (2H, m), 0.84 (3H, m). mp: −36−−38° C.

[VBBI][Tf$_2$N] $^1$H NMR (400 MHz, DMSO-d$_6$, ppm): δ 8.83 (1H, s), 7.44 (2H, s), 7.34 (2H, d) 7.27 (2H, d), 6.70 (1H, m), 5.79 (1H, d) 5.33 (1H, d), 5.31 (2H, s), 4.17 (2H, t), 1.84 (2H, m), 1.35 (2H, m), 0.94 (3H, t). mp: −61−−62° C.

[VBMI][BF$_4$]: $^1$H NMR (400 MHz, DMSO-d$_6$, ppm): 9.13 (1H, s), 7.71 (1H, s), 7.63 (1H, s), 7.52 (1H, d), 7.42 (2H, d), 6.75 (1H, m), 5.88 (1, d), 5.41 (2H, s), 5.26 (1H, d), 3.86 (3H, s). mp: 42-44° C.

Poly(ionic liquid)s were prepared from above ionic liquid monomers by free radical polymerization. A typical example is as the following: [VBBI][BF$_4$] (3 g), AIBN (30 mg) and DMF (3 ml) were charged into a reaction tube. The tube was tightly sealed, and degassed. It was immersed in an oil bath at 60° C. for 6 h. The solution was poured into methanol to precipitate out the polymer. The polymer was dried under vacuum at 100° C. The yield was 2.3 g (75%).

Poly[1-(p-Vinylbenzyl)-3-butyl-imidazolium tetrafluoroborate] (P[VBBI][BF$_4$]): $^1$H NMR (DMSO-d$_6$, 400 MHz, ppm): δ 9.12 (s, 1H), 7.8 (br, 1H), 7.4 (br, 1H), 7.1 (br, 2H), 6.4 (br, 2H), 5.6-4.9 (br, 2H), 4.1 (br, 2H), 2.1-1.0 (m, 7H), 0.8 (s, 3H). Anal. Calcd for (C$_{16}$H$_{21}$BF$_4$N$_2$)n: C, 58.56%; H, 6.45%; N, 8.54%. Found: C, 58.35%; H, 6.43%; N, 8.50%.

Poly[1-(p-Vinylbenzyl)-3-butyl-imidazolium hexafluorophosphate] (P[VBBI][PF$_6$]): $^1$H NMR (DMSO-d$_6$, 400 MHz, ppm): δ 9.16 (s, 1H), 7.72 (br, 1H), 7.47 (br, 1H), 7.04 (br, 2H), 6.42 (br, 2H), 5.23 (br, 2H), 4.15 (br, 2H), 2.1-0.8 (m, 10H) Anal. Calcd for (C$_{16}$H$_{21}$F$_6$N$_2$P)$_n$: C, 49.75%; H, 5.48%; N, 7.25%; Found: C, 49.70%; H, 5.37%; N, 7.12%.

Poly[1-(p-Vinylbenzyl)-3-butyl-imidazolium o-benzoic sulphimide] (P[VBBI] [Sac]): $^1$H NMR (DMSO-d$_6$, 400 MHz, ppm): δ 9.44 (s, 1H), 7.5-7.9 (br, 6H), 7.19 (br, 2H), 6.35 (br, 2H), 5.35 (br, 2H), 4.15 (br, 2H), 1.9-0.5 (m, 10H) Anal. Calcd for (C$_{23}$H$_{25}$N$_3$O$_3$S)$_n$: C, 65.25; H, 5.91; N, 9.93. Found: C, 64.11; H, 6.05; N, 9.68.

Poly[1-(p-Vinylbenzyl)-3-butyl-imidazolium trifluoromethane sulfonamide] (P[VBBI][Tf$_2$N]): $^1$H NMR (DMSO-d$_6$, 400 MHz, ppm): δ 9.20 (s, 1H), 7.73 (br, 1H), 7.44 (br, 1H), 6.94 (br, 2 H), 6.33 (br, 2H), 5.19 (br, 2H), 4.13 (br; 2H), 2.0-1.0 (m, 7H), 0.81 (s, 3 H). Anal. Calcd for (C$_{18}$H$_{21}$N$_3$F$_6$O$_4$S$_2$)$_n$: C, 41.46; H, 4.03; N, 8.06. Found: C, 41.46; H, 4.13; N, 7.94.

Poly {1-[2-(Methylacryloyloxy)ethyl]-3-butyl-imidazolium tetrafluoroborate} (P[MABI][BF$_4$]): $^1$H NMR (DMSO-d$_6$, 400 MHz, ppm): δ 9.1 (br, 1H), 7.9-7.6 (d, 2H), 4.8-3.8 (m 6H), 2.0-0.2 (m, 12H). Anal. Calcd for (C$_9$H$_{18}$BF$_4$NO$_2$)$_n$: C, 48.17 H, 6.49; N, 8.65. Found: C, 47.68; H, 6.48; N, 6.48.

Poly[1-(p-vinylbenzyl)-3-methyl-imidazolium tetrafluoroborate] (P[VBMI][BF$_4$]): $^1$H NMR (DMSO-d$_6$, 400 MHz, ppm): δ 9.10 (1H, br), 7.60-7.30 (2H, br), 7.10 (2H, br), 6.40 (2H, br), 5.30 (2H, br), 3.70 (2H, br) 2.1-0.5 (3H, br). Anal. Calcd for (C$_{13}$H$_{15}$BF$_4$N$_2$)$_n$: C, 54.58; H, 5.25; N, 9.80. Found: C, 52.74; H, 5.33; N, 9.38.

The poly(ionic liquid) with poly(ethylene oxide) backbone was synthesized from poly(epichlorohydrin) (Scheme 3). Aluminum isopropoxide (0.18 g, 0.88 mmol) was added into a 100 mL flask. The flask was degassed by repeated vacuum/ nitrogen purging (5 cycles). Degassed THF (25 mL) and epichlorohydrin (5.0 mL, 66 mmol) was added by degassed syringes. After the reaction flask was immersed into a 40° C. oil bath for 12 hours, the poly(epichlorohydrin) was precipitated out by adding a large amount of hexane. 3.3 g of poly (epichlorohydrin) was dissolved in 50 mL of DMF. N-butylimidazole (5.0 g, 40 mmol) was added to the DMF solution. This solution was stirred at 80° C. for 5 days, and then NaBF$_4$ (4.4 g, 40 mmol) was added. After the mixture was stirred at room temperature for 2 days, sodium chloride precipitate was removed by filtration. Anhydrous ethyl ether was added to the filtrate to precipitate the poly(ionic liquid). The obtained P[BIEO][BF$_4$] was washed with ethyl ether and dried in vacuum oven at 50° C. for one day. $^1$H-NMR (acetone-d$_6$): δ 8.86 (1H, s), 7.69 (2H, br), 4.44-4.31 (4H, br), 3.97 (1H, br), 3.67 (2H, br), 1.88 (2H, br), 1.34 (2H, br), 0.93 (3H, br). Anal. Calcd for (C$_{10}$H$_{17}$BF$_4$N$_2$O)$_n$: C, 44.80; H, 6.34; N, 10.46. Found: C, 44.66; H, 6.26; N, 10.11.

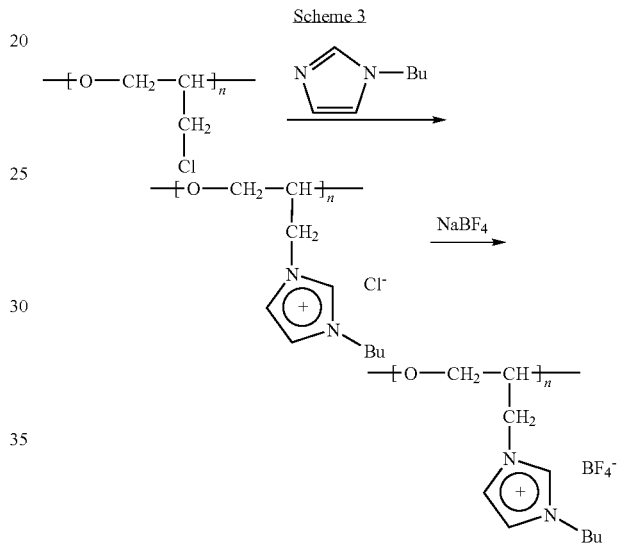

Scheme 3

The syntheses of ionic liquid monomers are shown in Schemes 1-3. Two steps were generally involved in the preparations: the quaternization reaction of 1-butylimidazole or 1-methylimidazole with 4-vinylbenzyl chloride or 2-bromoethyl methacrylate, and the anion exchange reaction of the halide ions with tetrafluoroborate, hexafluorophosphate, Sac or Tf$_2$N anions.

The quaternization with 4-vinylbenzyl chloride was fast with a high yield. The anion exchange of the resulting chloride [VBBI][Cl] and [VBMI][Cl] with BF$_4^-$ produced the monomers, [VBBI][BF$_4$] and [VBMI][BF$_4$], as crystalline solids, which are soluble in acetone, acetonitrile, dichloromethane, DMF, and DMSO, but insoluble in diethyl ether. [VBBI][PF$_6$] is also a solid with similar solubility. [VBBI] [Sac] and [VBBI][Tf$_2$N] are liquid at room temperature and soluble in acetone, acetonitrile, DMF, and DMSO. [VBBI] [Tf$_2$N] is also soluble in ethyl ether.

The quaternization of N-butylimidazole with 2-bromoethyl methacrylate was slow and difficult to get high yield of [MABI][Br]. After the anion exchange, [MABI][BF$_4$] is also a liquid at room temperature and soluble in above polar solvents but insoluble in ethyl ether and other nonpolar solvents.

All above ionic liquid monomers, unlike their corresponding chloride salts, are insoluble in water. So unreacted chloride salts could be easily removed by washing with water. Silver nitrate test indicated that no chloride was present in all the ionic liquid monomers.

The poly(ionic liquid)s, except for P[BIEO][BF$_4$] which was synthesized by the polymer reaction shown in Scheme 3, were prepared by free radical polymerization of the ionic liquid monomers using AIBN as initiators. DMF was used as solvent because all poly(ionic liquid)s are soluble in it. All these ionic liquid monomers are easily polymerized with high conversions. Poly(ionic liquid)s were precipitated in methanol to remove unreacted monomers. DMF residue in polymers was removed by drying at 100° C. under vacuum. All poly(ionic liquid)s can dissolve in DMF, DMSO, acetonitrile, but are insoluble in water, dichloromethane and toluene. H$^1$ NMR and element analysis indicated the poly(ionic liquid)s were pure.

$CO_2$ Sorption and Desorption

The $CO_2$ sorption of the poly(ionic liquid)s was measured using a Cahn 1000 Electrobalance. The sample pan and the counterweight of the balance were configured symmetrically to minimize buoyancy effects. The microbalance has 100 g capacity and 1.0 µg sensitivity and is suitable for study of sorption and diffusion of gases on/in solid or liquid materials. $CO_2$ gas (99.995%) was dried by passing two drying columns (length×diameter: 15 in×2 in) packed with $P_2O_5$. The fine powder of the ionic liquid polymer was dried and degassed at 70° C. under vacuum for 12 h to remove moisture or other volatile contaminants. It was further dried in the balance by evacuating the chamber at high vacuum until its weight reached constant for at least 30 min. $CO_2$ was introduced into the chamber and the sample weight increase was recorded until the weight did not change significantly in 30 min. The buoyancy effects in these measurements were corrected according to the literature.[29] The system was validated by measuring the $CO_2$ sorption of an ionic liquid, 1-n-butyl-3-methyl imidazolium tetrafluoroborate ([bmim][BF$_4$]). The measured $CO_2$ sorption capacity of [bmim][BF$_4$] was identical to the reported.[19]

$CO_2$ has remarkable solubility in imidazolium-based ionic liquids because of its interactions with the anions and cations of ionic liquids.[19] The $CO_2$ sorption of (P[VBBI][BF$_4$](a), P[VBBI][Tf$_2$N](b), P[MABI][BF$_4$](c), P[VBBI][Sac](d)), with their corresponding monomers ([VBBI][Tf$_2$N](e), [MABI][BF$_4$](g), [VBBI][BF$_4$](h), [VBBI][Sac](i)), and an ionic liquid [bmim][BF$_4$] (f) as a function of time (592.3 mmHg $CO_2$, 22° C.) is shown in FIG. 1. The $CO_2$ solubility of [bmim][BF$_4$] was tested first and found consistent with that reported in the literature,[19] which validated the setup of the apparatus.

At the equilibrium, P[VBBI][BF$_4$], P[VBBI][Tf$_2$N], P[MABI][BF$_4$] and P[VBBI][Sac], respectively, took up 2.27 mol %, 2.23 mol %, 1.78 mol % and 1.55 mol % of $CO_2$ in terms of their monomer units. In comparison, room temperature ionic liquid [bmim][BF$_4$] absorbed 1.34 mol % of $CO_2$ under the same conditions. [VBBI][BF$_4$] monomer had no measurable sorption of $CO_2$ because of its crystalline structure. [MABI][BF$_4$], [VBBI][Sac] and [VBBI][Tf$_2$N] monomers are liquid at room temperature. [MABI][BF$_4$] had the same $CO_2$ sorption capacity as [bmim][BF$_4$]. [VBBI][Tf$_2$N] had a $CO_2$ sorption capacity of 1.96 mol %, higher than that of [bmim][BF$_4$], which is consistent with the report that the ionic liquid with Tf$_2$N anions had higher capacity than ionic liquids with BF$_4$ anions.[14] [VBBI][Sac] did not take up any $CO_2$ when it was exposed to $CO_2$ (FIG. 1). This comparison shows that polymerizing ionic liquids can increase the $CO_2$ sorption capacity.

Meanwhile, the $CO_2$ sorption of the ploy(ionic liquid)s was much faster than that of ionic liquids. It takes only several minutes for the poly(ionic liquid)s to reach their 90% capacity and less than 30 minutes to reach their equilibrium capacity. In contrast, room temperature ionic liquids [MABI][BF$_4$] and [bmim][BF$_4$] needed more than 400 min to reach their equilibrium capacity (FIG. 1).

Figure 2:
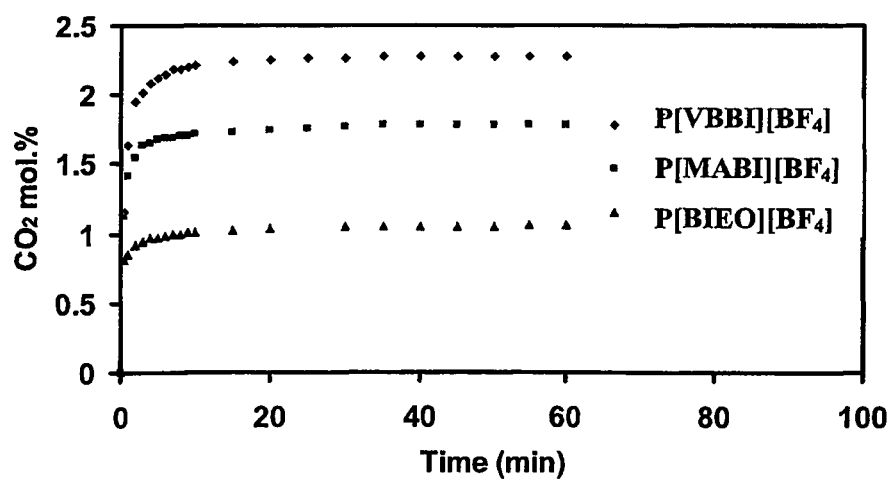
FIG. 2 is a graphical representation of the $CO_2$ sorption of poly(ionic liquid)s with different polymer backbones (592.3 mmHg of $CO_2$ and 22° C.).

The $CO_2$ sorption of poly(ionic liquid)s with different backbones, cations, and anions was compared to understand the factors affecting the $CO_2$ sorption. The $CO_2$ sorption kinetics of poly(ionic liquid)s with different backbones are shown in FIG. 2. At the equilibrium, the polymers sorbed 2.27 mol % (P[VBBI][BF$_4$]), 1.78 mol % (P[MABI][BF$_4$]) and 1.06 mol % (P[BIEO][BF$_4$]), respectively, in terms of their monomer units at 592.3 mmHg of $CO_2$ and 22° C. With the same butylimidazolium cation and BF$_4^-$ anion, the polymer with polystyrene backbone had a higher $CO_2$ sorption capacity than those with polymethylmethacrylate and polyethylene glycol backbones. The polymer with polyethylene glycol backbone had the lowest capacity.

Figure 3:
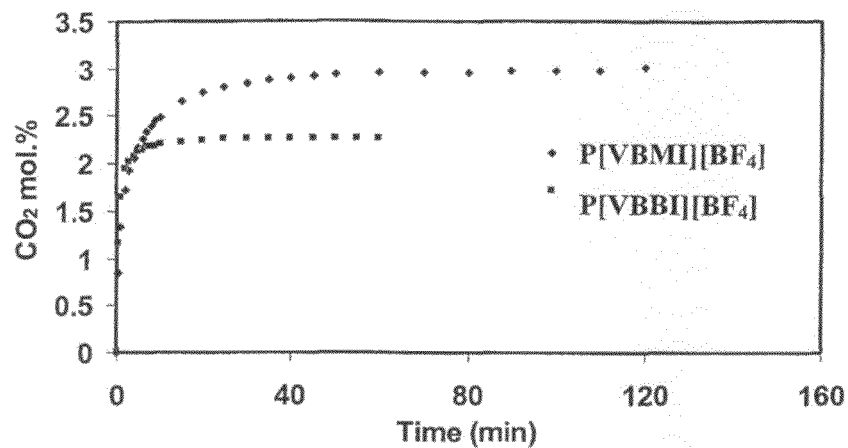
FIG. 3 is a graphical representation of the $CO_2$ sorption of poly(ionic liquid)s with different substituents (592.3 mmHg of $CO_2$ and 22° C.).

The effect of substituent of the imidazolium cation on the $CO_2$ sorption is shown in FIG. 3. P[VBMI][BF$_4$], which has a methyl substituent on its imidazolium cation, had a higher capacity (3.05 mol. %) than P[VBBI][BF$_4$] (2.27 mol. %) with butyl group. This indicates that a large substituent on the imidazolium cation may block the $CO_2$ sorption.

Figure 4:
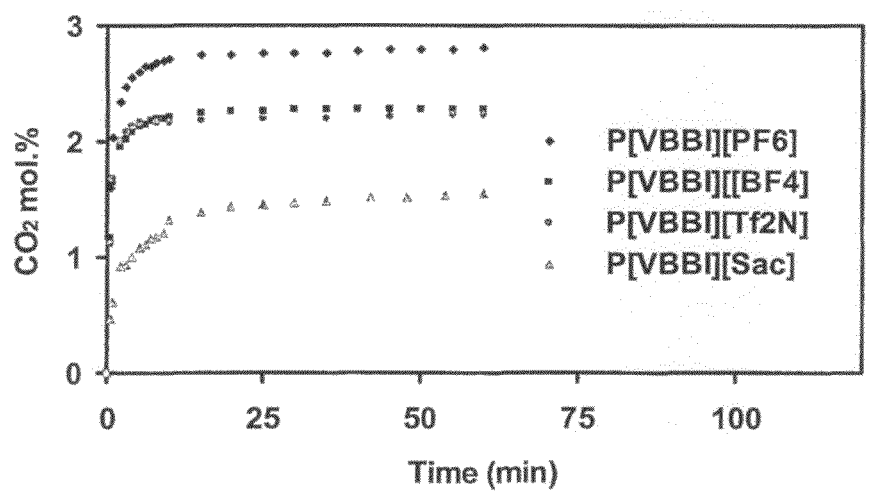
FIG. 4 is a graphical representation of the $CO_2$ sorption of poly(ionic liquid)s with different anions (592.3 mmHg of $CO_2$ and 22° C.).

The effect of the anions on the $CO_2$ sorption capacity of the poly(ionic liquid)s is shown in FIG. 4. The $CO_2$ sorption capacity the P[VBBI]-based polymers depends on the type of the anions: it was 2.80 mol. % for P[VBBI][PF$_4$], 2.27 mol % for P[VBBI][BF$_4$], 2.23 mol. % for P[VBBI][Tf$_2$N] and 1.55 mol. % for P[VBBI][Sac], respectively, in terms of their monomer units at 592.3 mmHg of $CO_2$ and 22° C. This trend is different from that of ionic liquids. The $CO_2$ solubility in ionic liquids with Tf$_2$N$^-$ anions is much higher than those with PF$_6^-$ or BF$_4^-$ anions.[19] By contrast, the poly(ionic liquid) with PF$_6$— anions ([PVBBI][PF$_6$]) had the highest sorption capacity, and those with BF$_4^-$ and Tf$_2$N$^-$ anions had a similar capacity. The poly(ionic liquid) with Sac$^-$ anions could take up 1.55 mol % of $CO_2$ even though the anion contains no fluorine atoms. These results indicate that for poly(ionic liquid)s, fluorine-atoms are not a decisive factor for $CO_2$ sorption but fluorine-atoms in the anions indeed enhance the $CO_2$ sorption.

Figure 5:
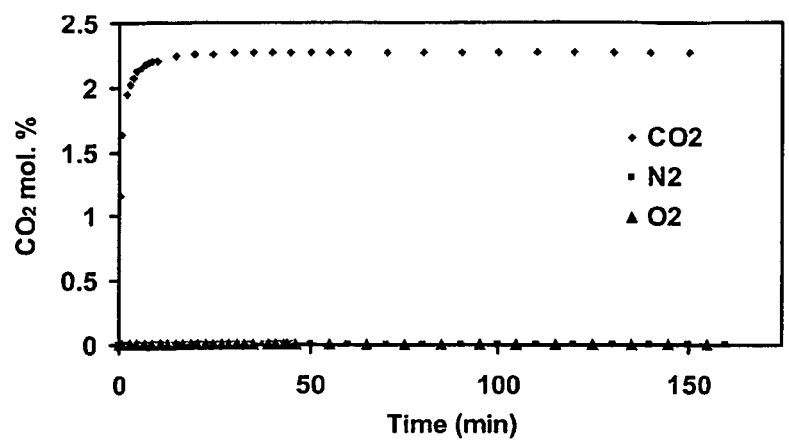
FIG. 5 is a graphical representation of the gas ($CO_2$, $O_2$, $N_2$) sorption of P[VBBI][$BF_4$] as a function of time at 592.3 mmHg, 22° C.

The $CO_2$ sorption of the polymers is very selective, as shown in FIG. 5. There was no weight increase when the polymers were exposed to $N_2$ or $O_2$ under the same conditions, which means that poly(ionic liquid)s can selectively absorb $CO_2$.

Figure 6:
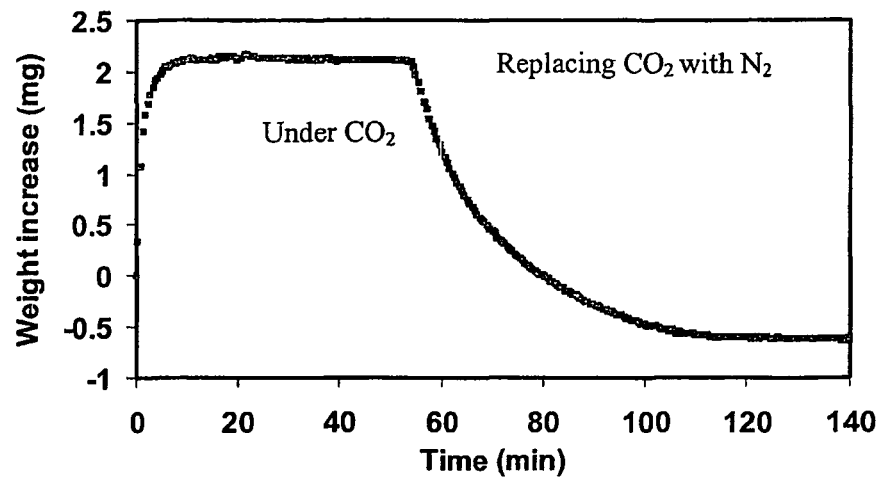
FIG. 6 is a graphical representation of the weight change of P[VBBI][$BF_4$] (1 g) (without buoyancy correction) after introducing $CO_2$ into the system, and then replacing $CO_2$ with $N_2$ (total pressure 592.3 mmHg, 22° C.).

The selective $CO_2$ sorption of the poly(ionic liquid)s was also confirmed by a gas-replacement experiment. The $CO_2$ sorption of P[VBBI][BF$_4$] (1 gram) and desorption by replacing $CO_2$ with $N_2$ are shown in FIG. 6. After introducing $CO_2$ into the balance, the sample weight increased rapidly until it became constant after 12 min. The weight increase was 2.1 mg, and the actual weight increase was 3.10 mg after a buoyancy correction. When $N_2$ was introduced into the chambers while maintaining the total pressure in the chambers at ambient pressure (592.3 mmHg), the sample weight decreased gradually, and finally reached −0.56 mg, which was equal to the buoyancy of the sample under $N_2$. This experiment indicates that the poly(ionic liquid) does not take up $N_2$. Similar experiments conformed that there was no $O_2$ sorption.

Figure 7:
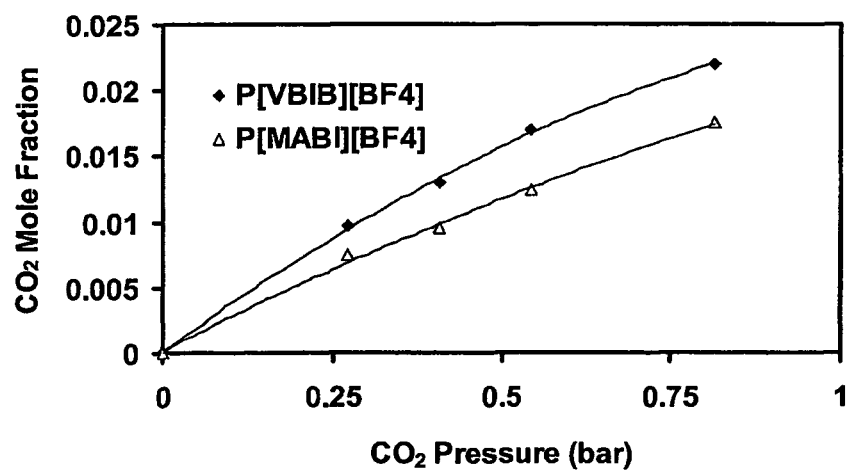
FIG. 7 is a graphical representation of the isothermal sorption of P[VBBI][$BF_4$] and P[MABI][$BF_4$] at different $CO_2$ pressures (22° C.).

The sorption isotherms of P[VBBI][BF$_4$] and P[MABI][BF$_4$] at different $CO_2$ partial pressures and 22° C. are shown in FIG. 7. The different $CO_2$ partial pressures were obtained by adjusting the $N_2$/$CO_2$ ratio of the mixed gas charged to the balance chambers because P[VBBI][BF$_4$] and P[MABI][BF$_4$] had no $N_2$ sorption. As shown in FIG. 7, the $CO_2$ mole fraction in the polymers increased with the increase of $CO_2$ partial pressure.

Henry's constant is defined as $$H = \lim_{x \to 0} \frac{p}{x}$$

where H is Henry's constant, x is the mole fraction of gas sorbed in the polymer in term of monomeric unit, and P is the $CO_2$ partial pressure Since the x vs. P plots were not linear in the entire pressure range, Henry's constants were calculated by fitting the data and extrapolating the slope to the zero $CO_2$ partial pressure.[16] Henry's constant was 26.0 bar for P[VBBI][$BF_4$] and 37.7 bar for P[MABI][$BF_4$], which is lower than that of room temperature ionic liquid [bmim][$PF_6$] (38.7 bar at 10° C. and 53.4 bar at 25° C.).[16]

Stable sorption capacity after repeated sorption/desorption is important for materials used for $CO_2$ separation. Four cycles of $CO_2$ sorption and desorption of P[VBBI][$BF_4$] and P[MABI][$BF_4$] were tested by filling the chambers with $CO_2$ and then vacuuming (FIG. 8a). The sorption and desorption of P[VBBI][$BF_4$] and P[MABI][$BF_4$] were all very fast. It took only about 30 min to take up $CO_2$ and to have a complete desorption of $CO_2$. The desorption was complete, suggesting that the sorption/desorption was reversible. No change in sorption/desorption kinetics and sorption capacity was observed after the four cycles. By contrast, the desorption of $CO_2$ from room temperature ionic liquids [bmim][$BF_4$] was very slow (FIG. 8b)

Figure 9:
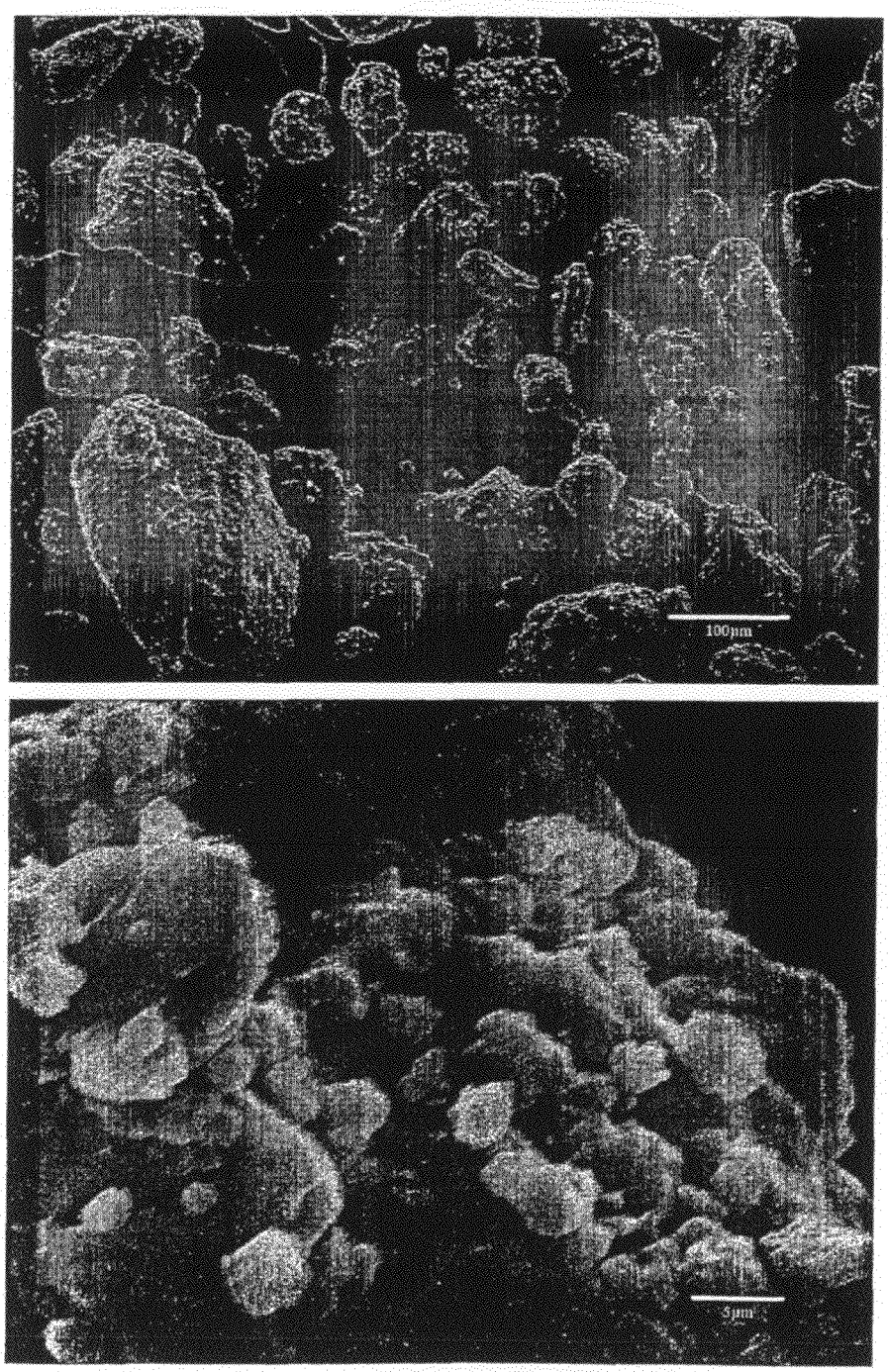
FIGS. 9A and 9B are scanning electron micrographs of P[VBBI][$BF_4$] particles.

The enhanced sorption capacity and fast sorption/desorption rates of the poly(ionic liquid)s were unexpected because all polymers are solid at room temperature. An immediate question is whether the sorption occurred on the surface (adsorption) or in the bulk (absorption) or both. The BET surface area of P[VBBI][$BF_4$] was measured by nitrogen sorption and its morphology was examined by SEM. The measured BET surface area of P[VBBI][$BF_4$] sample was 0.295 $m^2/g$, The calculated $CO_2$-adsorption assuming a monolayer of $CO_2$ on this surface was only 0.0128 wt %, much less than the measured $CO_2$ sorption capacities. The SEM (FIGS. 9A, B) indicated that the particles had a nonporous structure, and the average diameter of the particles was about 100 μm.

Figure 10:
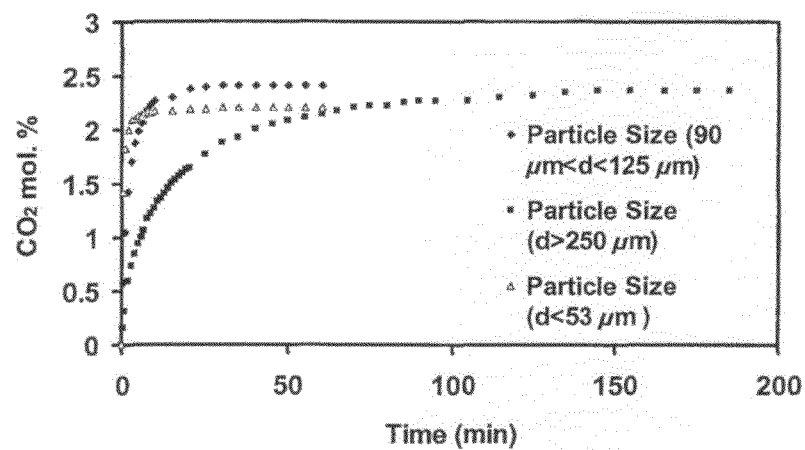
FIG. 10 is a graphical representation of the $CO_2$ sorption of P[VBBI][$BF_4$] with different particle sizes (592.3 mmHg, 22° C.).

The $CO_2$ sorption of P[VBBI][$BF_4$] samples with different particle sizes was tested (FIG. 10). The particle size did not significantly affect the capacity of $CO_2$ sorption and the sample with a big size even had a slightly higher sorption capacity. However, the particle size affected the rate of $CO_2$ sorption. The $CO_2$ sorption of the sample with big particle sizes (>250 μm in diameter) was slow, and needed about 120 minutes to reach its full sorption capacity, while those with the particle diameters less than 125 μm in diameter only needed less than 30 mins.

Without being bound to any particular theory, it appears that the $CO_2$ sorption of the polymer particles involves more absorption (the bulk) but less adsorption (the surface). Their $CO_2$ sorption capacity mainly depends on the chemical structure of poly(ionic liquid)s, while the rate of $CO_2$ sorption depends on the particle size due to the $CO_2$ diffusion in the polymers.

EXAMPLE 2

Materials 4-vinylbenzyl chloride (90%), 1-methylimidazole (98%), lithium trifluoromethane sulfonimide 99.95%, potassium hexafluorophosphate 98%, sodium tetrafluoroborate (98%), 2,6-Di-tert-butyl-4-methyl phenol (98%) (DBMP), N,N-Dimethylformamide (99.8%) (DMF), acetonitrile (99.5+%), acetone (99.5+%), aqueous [2-(methacryloyloxy)ethyl]trimethyl ammonium chloride solution (75 wt. %), (p-vinylbenzyl)trimethylammonium chloride (98%), triethylamine (99.5%), tributylamine (99.5%) triphenylphosphine 99%, α,α'-azobis(isobutyrobitrile)(AIBN) (98%) were purchased from Aldrich. 1-methyl imidazole 99%, o-Benzoic sulphimide sodium salt hydrate (97%) were purchased from Lancaster Synthesis Inc. Pyridine was purchased from Fisher scientific. All chemicals were used as received.

Synthesis and Characterization (p-vinylbenzyl)trimethyl ammonium tetrafluoroborate ([VBTMA][$BF_4$]) and 2-(methacryloyloxy)ethyltrimethylamnonium tetrafluoroborate ([MATMA][$BF_4$]) were synthesized as described previously[30] using (p-vinylbenzyl)triethyl phosphonium tetrafluoroborate ([VBTEP][$BF_4$]), (p-vinylbenzyl)triphenyl phosphonium tetrafluoroborate ([VBTPP][$BF_4$]).

The synthesis of p-vinylbenzyl)triphenyl phosphonium tetrafluoroborate ([VBTPP][$BF_4$]), 1-(p-vinylbenzyl)pyridinium tetrafluoroborate ([VBP][$BF_4$]) and 1-(p-vinylbenzyl)-3-methyl-imidazolium tetrafluoroborate ([VBMI][$BF_4$]) is similar to 1-(p-vinylbenzyl)-3-butyl-imidazolium tetrafluoroborate ([VBBI][$BF_4$]) [VBBI][$BF_4$] (VBIT), as reported previously,[28] using triphenylphosphine, pyridine and 1-methyl imidazole instead of 1-butylimidazole, respectively.

The synthesis of (p-vinylbenzyl)triethylammonium tetrafluoroborate [VBTEA][$BF_4$] and (p-vinyl benzyl)tributylammonium tetrafluoroborate [VBTBA][$BF_4$] was follows: In a 50 ml flask, 4-vinylbenzyl chloride (6.1 g, 0.04 mol) and triethylamine (4.2 g, 0.042 mol) mol were mixed and heated at 50° C. under $N_2$ atmosphere for 2 days. The formed solid was washed with diethyl ether. The resultant white solid (8.5 g, 0.033 mol) was mixed with $NaBF_4$ (3.8 g, 0.035) in 50 acetonitrile and stirred at room temperature for 2 days. The salt precipitate was removed by filtration. The filtrate was concentrated and poured into 200 ml diethyl ether to precipitate out product. White crystal precipitate was formed, collected by filtration, and dried under vacuum. The total yield was 9.2 g (75%). [VBTBA][$BF_4$] was synthesized according to a similar procedure with yield of 64%.

In the synthesis of bis[p-vinylbenzyl)dimethylammonium] ethane, [BVDEA][$BF_4$], which is an ionic liquid crosslinker, tetramethylethylenediamine (5.8 g, 0.05 mol), 4-vinylbenzyl chloride (16.0 g, 0.105 mol) and 0.1 g DBMP were mixed in 50 ml DMF. The resulting solution was heated at 50° C. for 2 days. The solution was poured into 400 ml diethyl ether to precipitate out the product. After filtration and drying under vacuum, 15.8 g white crystal product was obtained. The product was reacted with $NaBF_4$ (4.3 g, 0.04 mol) in 50 ml dried acetonitrile for 2 days. After the reaction, the insoluble chloride salt was removed by filtration. The product was collected by filtration and dried under vacuum. The overall yield was 16.7 g (63.7%).

Poly(ionic liquid)s were synthesized by free radical polymerization using AIBN as initiator in DMF as described previously.[30] The crosslinked P[VBTMA][$BF_4$] was synthesized in the same way except for adding 5 wt % of the crosslinker.

The polymers were characterized by $^1$H NMR on a Bruker Advance DRX-400 spectrometer using $d^6$-dimethylsulfoxide (DMSO-$d^6$) as solvent. The elemental analyses of polymers were tested by Midwest Microlab LLC (US). The $CO_2$ sorption of the poly(ionic liquid)s was measured using a Cahn 1000 Electrobalance.

The structures of poly(ionic liquid)s are shown in Schemes 4 and 5. Two steps were generally involved in the preparation of ionic liquid monomers: the quaternization reaction and the anion exchange reaction of the halide ions with tetrafluoroborate, hexafluorophosphate, Sac or Tf$_2$N anions. The resulting monomers are soluble in polar solvents, such as DMF, acetone, or acetonitrile. All monomers based on ammonium except for P[VBTMA][Tf$_2$N] are soluble in H$_2$O. The ionic liquid monomers based on phosphonium, pyridium, imidazolium are insoluble in H$_2$O. The poly(ionic liquid)s are soluble in DMF.

The $^1$H NMR and elemental analyses indicated that the ionic liquid monomers and poly(ionic liquid)s obtained were pure.

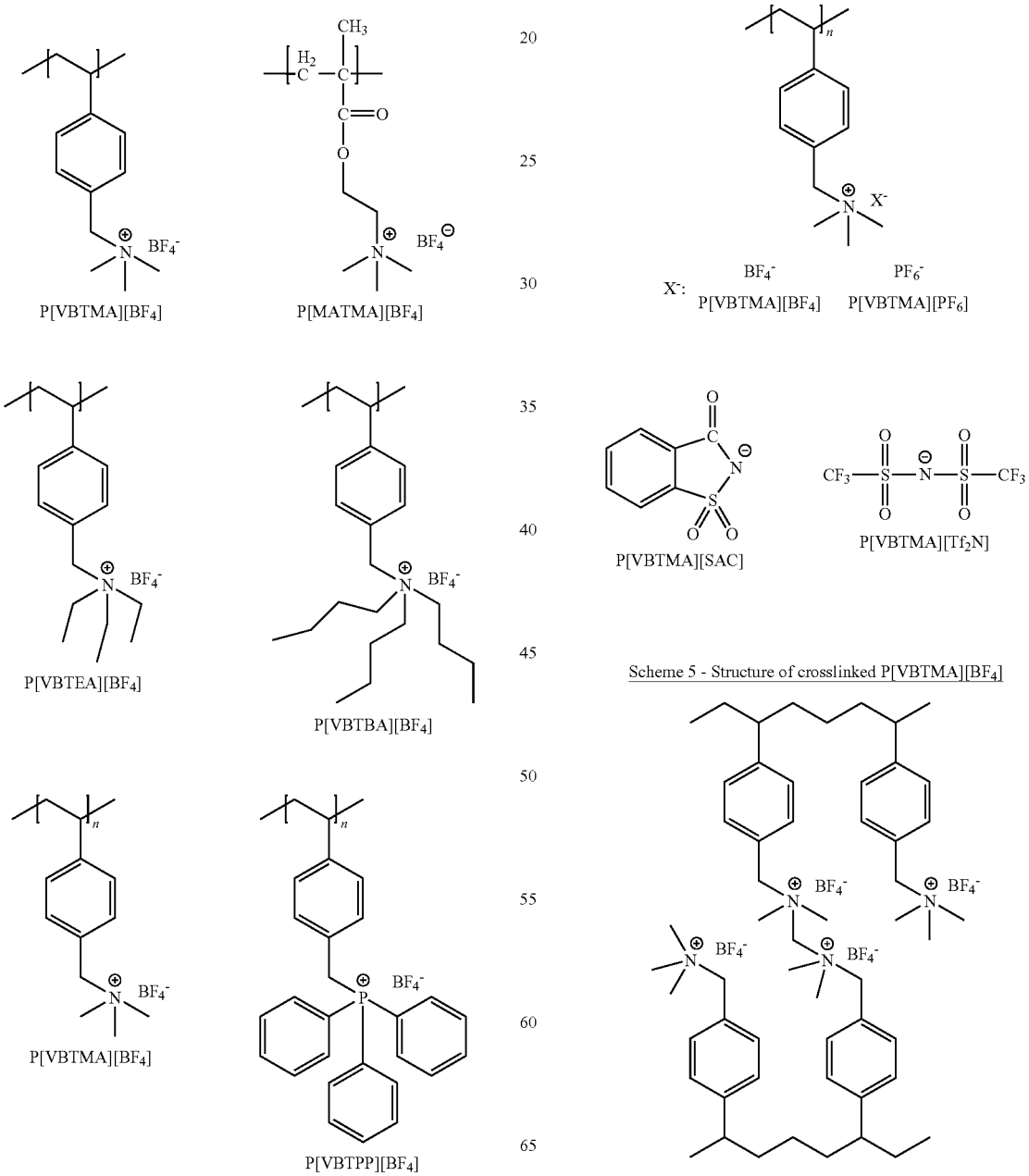

CO₂ Sorption and Desorption

Figure 11:
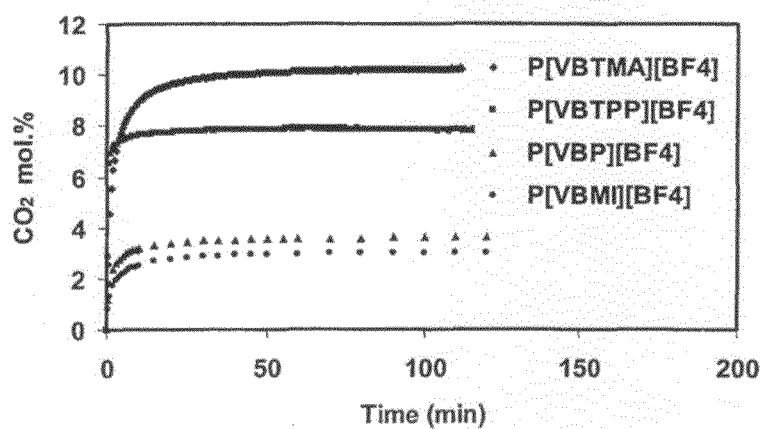
FIG. 11 is a graphical representation of the $CO_2$ sorption of poly(ionic liquid)s with different types of cation.

FIG. 11 shows the effect of cation types on $CO_2$ sorption of poly(ionic liquid)s. The $CO_2$ sorption capacity of poly(ionic liquid)s with different cations is as follows: P[VBTMA][BF$_4$] (10.2 mol. %)<P[VBTPP][BF$_4$] (7.8 mol. %)<P[VBP][BF$_4$] (3.6%)<P[VBMI][BF$_4$] (3.0%). The solubility increases with increasing cation polarity. The polymer based on ammonium has the highest solubility because of its highest cation polarity. The polymer based on imidazolium, with the lowest cation polarity, has the lowest solubility.

Figure 12:
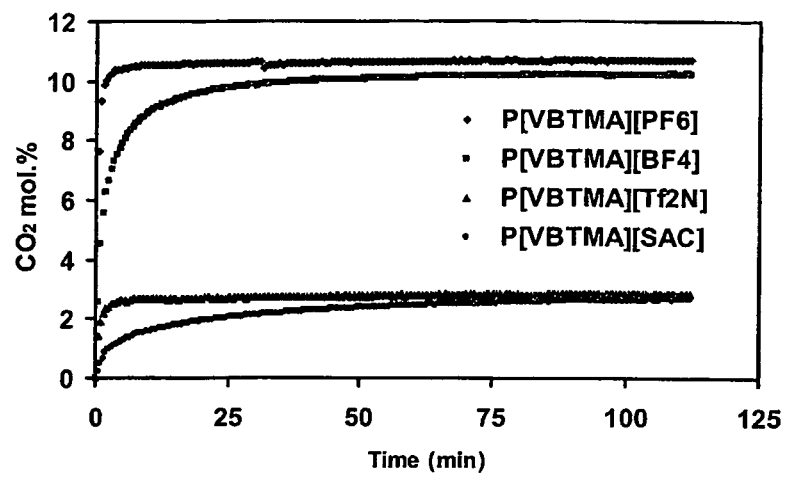
FIG. 12 is a graphical representation of the $CO_2$ sorption of poly(ionic liquid)s with different types of anion.

FIG. 12 shows the effect of anion types on the $CO_2$ solubility of poly(ionic liquid)s. The four polymers have the same cation structure, but different anions. P[VBTMA][BF$_6$] and P[VBTMA][BF$_4$] have a similar $CO_2$ solubility of 10.7 mol. % and 10.2 mol. %, respectively. P[VBTMA][[Sac] and P[VBTMA][Tf$_2$N] have a solubility of 2.8 mol. % and 2.7%, respectively. The two poly(ionic liquid)s with inorganic anion have much higher solubility than the two with an organic anion, which can be explained in terms of the anion polarity effect on the interaction between the poly(ionic liquid)s with $CO_2$; the higher the anion polarity, the higher the affinity to $CO_2$. As a result the poly(ionic liquid) with high anion polarity exhibit a higher $CO_2$ solubility.

Figure 13:
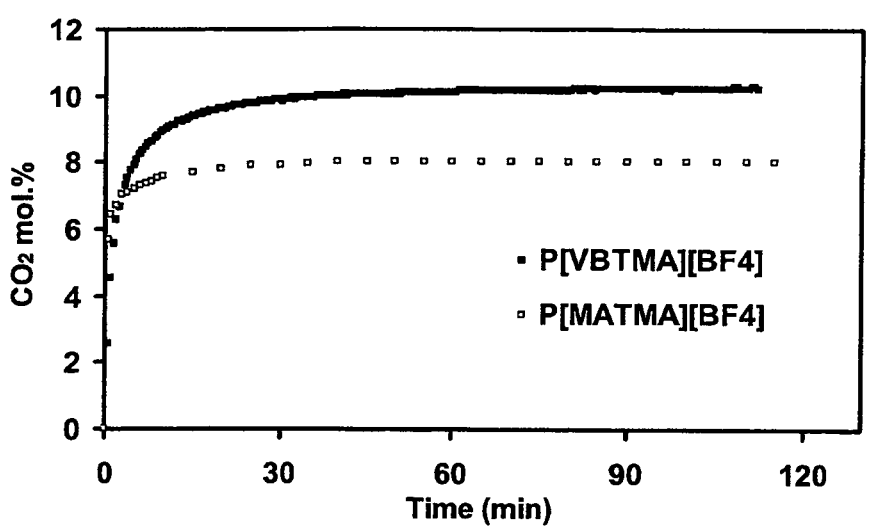
FIG. 13 is a graphical representation of the $CO_2$ sorption in poly(ionic liquid)s with different backbones

The $CO_2$ sorption kinetics of poly(ionic liquid)s with different backbones are shown in FIG. 13. At the equilibrium, the polymers took up 10.22 mol % (P[VBTMA][BF$_4$]), 7.99 mol % (P[MATMA][BF$_4$]), respectively, in terms of their monomer units at 592.3 mmHg of $CO_2$ and 22° C. With the same ammonium cation and BF$_4^-$ anion, the polymer with polystyrene backbone had a higher $CO_2$ sorption capacity than that with polymethylmethacrylate backbone.

Figure 14:
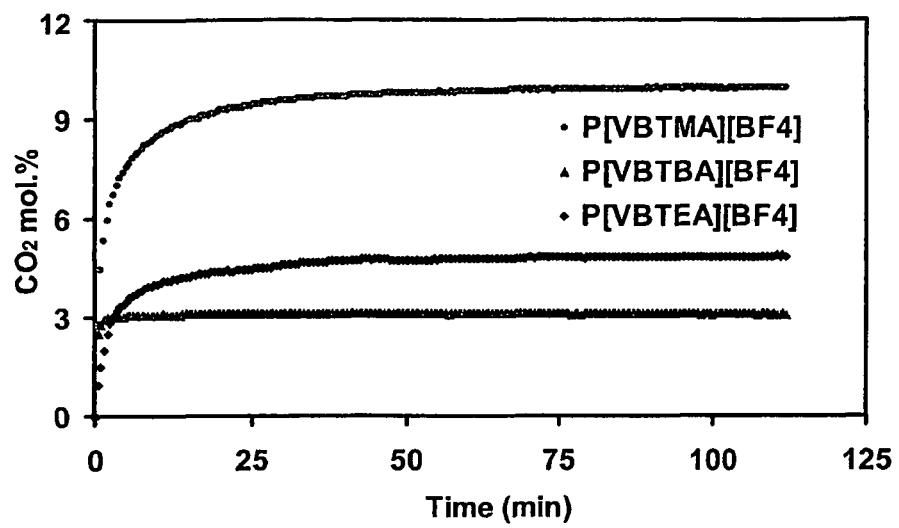
FIG. 14 is a graphical representation of the $CO_2$ sorption in poly(ionic liquid)s with different substituents.

The effect of substituent of the ammonium cation on the $CO_2$ sorption is shown in FIG. 14. Their $CO_2$ sorption capacities are as follows: P[VBTMA][BF$_4$] (10.2 mol. %)>P[VBTEA][BF$_4$] (4.85 mol. %)>P[VBTBA][BF$_4$] (3.1 mol. %). Obviously, the $CO_2$ sorption capacity decreases with increasing length of the substituent, which indicates that a large substituent on the ammonium cation blocks $CO_2$ sorption.

Figure 15:
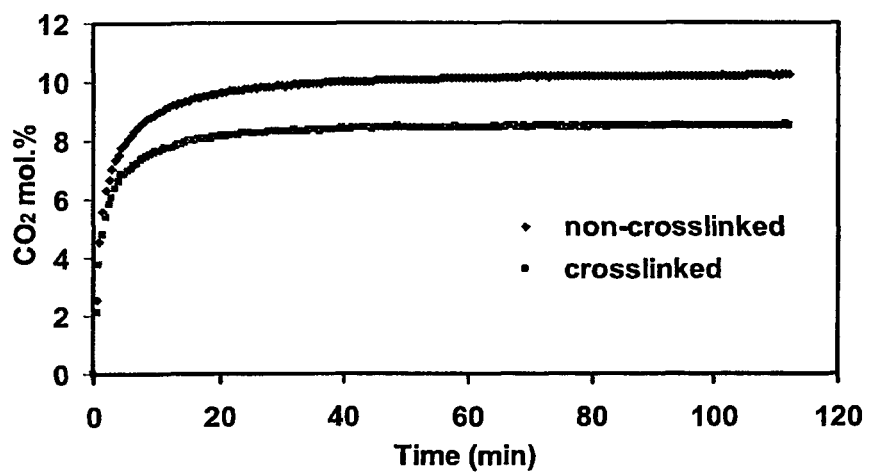
FIG. 15 is a graphical representation of the effect of crosslinking on $CO_2$ sorption in poly(ionic liquid)s.

FIG. 15 shows the effect of crosslinking on $CO_2$ sorption of poly(ionic liquid). Compared with P[VBTMA][BF$_4$] without crosslinking, the $CO_2$ sorption capacity of 5%-crosslinked P[VBTMA][BF$_4$] decreased by 17.3%.

EXAMPLE 3

Materials

Bis(2-hydroxyethyl)dimethyl ammonium chloride (Acros, 99%), 2,2-Bis(bromomethyl)-1,3-propanediol (Aldrich, 98%), 1-Methylimidazole (Lancaster, 99%), 1-Butylimidazole (Aldrich, 98%), 1,1-Carbonyldiimidazole (Aldrich, reagent grade), terephthaloyl chloride (Aldrich, 99+%), sodium tetrafluoroborate (Aldrich, 98%, NaBF$_4$), dimethyl sulfoxide (Aldrich, 99.9+%, DMSO) and methanol (A.C.S. reagent) were used as received. Acetonitrile (Aldrich, 99.5+%), N,N-Dimethylformiamide (Aldrich, 99.8%, DMF) and triethylamine (EMD, 99.5%, Et$_3$N) were used after removing water by molecular sieves.

Synthesis and Characterization

The synthesis of the monomers, Bis(2-hydroxyethyl)dimethyl ammonium tetrafluoroborate ([BHEDMA][BF$_4$]) 1, 2,2-Bis(methylimidazolium methyl)-1,3-propanediol tetrafluoroborate ([BMIMP][BF$_4$]) 2 and 2,2-Bis(butylimidazolium methyl)-1,3-propanediol tetrafluoroborate ([BBIMP][BF$_4$]) 3 is shown in Scheme 6. The reagents and conditions were: a) NaBF$_4$, acetonitrile, room temperature, 48h, 96%; b) 1-Methylimidazole, N$_2$, 60° C., 24h, 98%; c) NaBF$_4$, acetonitrile, room temperature, 48h, 96%; d) 1-Butylimidazole, N$_2$, 80° C., 24h, 97%; d) NaBF$_4$, acetonitrile, room temperature, 48h, 96%. Monomer 1 is an ammonium-based ionic liquid, while 2 and 3 are imidazolium-based ionic liquids.

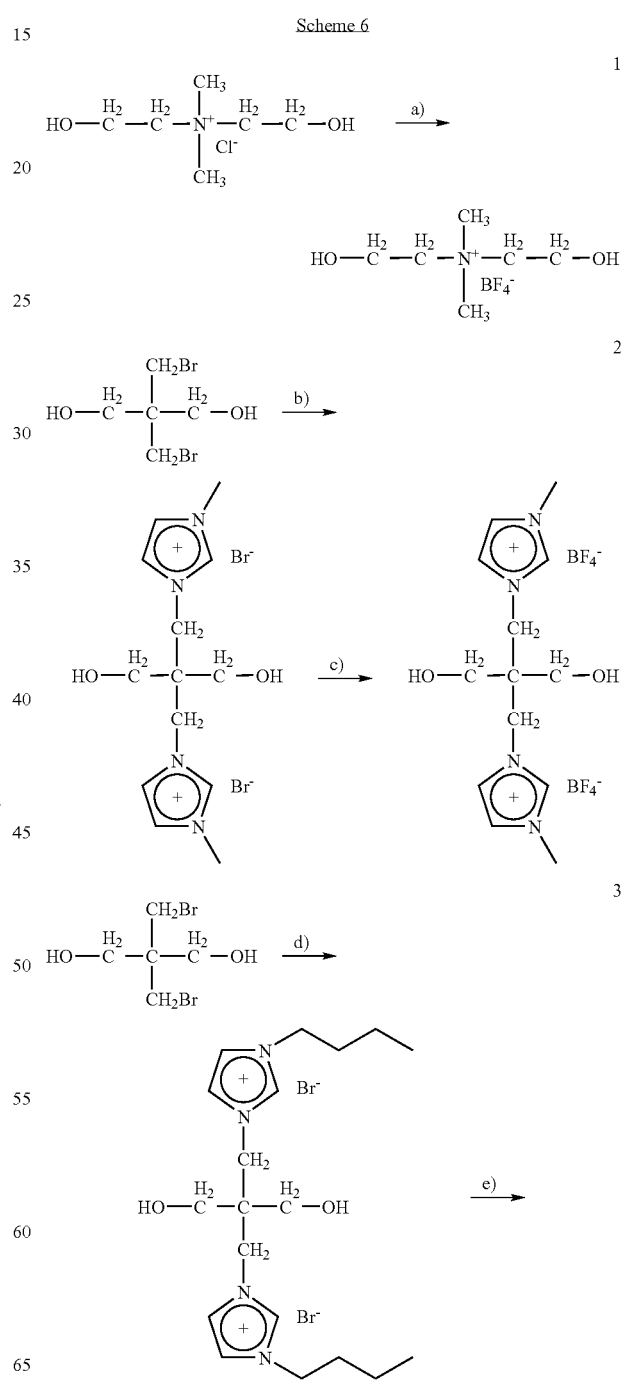

Scheme 6

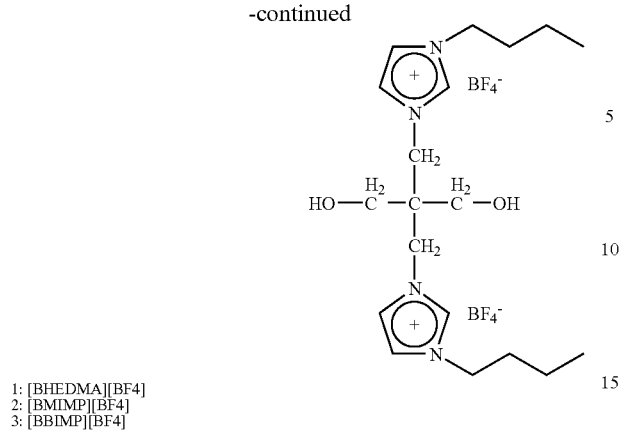

1: [BHEDMA][BF4]
2: [BMIMP][BF4]
3: [BBIMP][BF4]

The synthesis of polycarbonate (PC) and polyethylene terephthalate (PET) types of ionic liquid polymers by condensation polymerization is as follows. The PC type of ionic liquid polymers can be synthesized using the monomers 1 (2 or 3) reacted with 1,1-carbonyldiimidazole. The PET type of ionic liquid polymers can be synthesized using the monomers 1 (2 or 3) reacted with terephthaloyl chloride, respectively. Both kinds of condensation polymerizations required a strict 1:1 ratio of the reagents with different difunctional groups. All the reactions were carried out in DMF at 60° C. for 24 h. All the polymers were precipitated by methanol after polymerization and dried under vacuum at 50° C.

The ionic liquid monomer 1 is colorless, while 2 and 3 have a light yellow color. Synthesis of 2 and 3 in a $N_2$ atmosphere is necessary because the imidazole group is liable to be oxidized by the $O_2$ in the air, which will make the product have a brown color. For the 1 methylimidazole is more active than 1-butylimidazole, it will react with 2,2-Bis(bromomethyl)-1,3-propanediol at a lower temperature (60° C.) than that of the 1-Butylimidazole (80° C.). All the monomers (1, 2 and 3) are viscous liquids, and they all absorb moisture quickly when contacting air, so all of them need to be dried in a rotating evaporator before the polymerization.

The polycondensation synthesis of the PC type polymers, poly(bis(2-hydroxyethyl)dimethyl ammonium tetrafluoroborate) carbonate (P[BHEDMA][BF$_4$]C) 4, poly(2,2-Bis(methylimidazolium methyl)-1,3-propanediol tetrafluoroborate) carbonate (P[BMIM][BF$_4$]C) 5, and poly(2,2-Bis(butylimidazolium methyl)-1,3-propanediol tetrafluoroborate) carbonate (P[BBIMP][BF$_4$]C) 6 is shown in Scheme 7. Polymer 4 is white, while 5 and 6 have a light yellow color. At room temperature, all polymers are easily crashed into fine powders. Polymer 4 is soluble in acetonitrile, and polymer 5 and 6 are soluble in chloroform. They all can be cast into membranes for $CO_2$ separation using a solvent evaporation method.

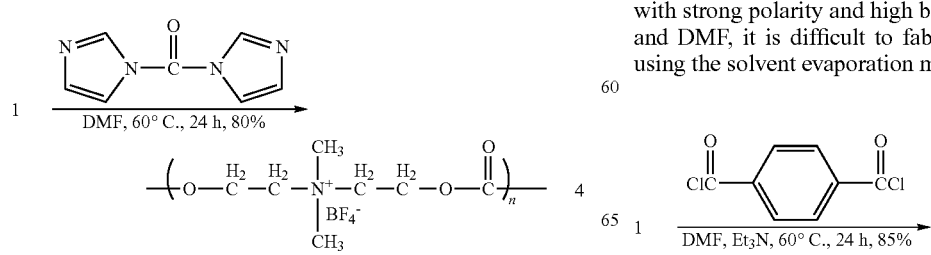

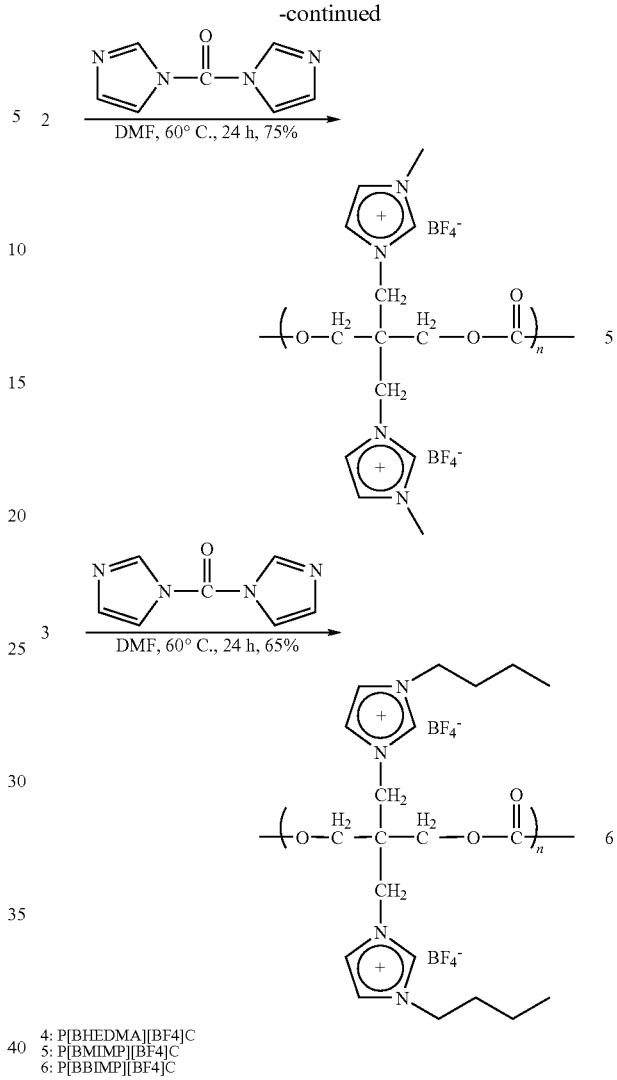

4: P[BHEDMA][BF4]C
5: P[BMIMP][BF4]C
6: P[BBIMP][BF4]C

The synthesis of the PET type polymers, poly(Bis(2-hydroxyethyl)dimethyl ammonium tetrafluoroborate) terephthalate (P[BHEDMA][BF$_4$]T) 7, poly(2,2-Bis(methylimidazolium methyl)-1,3-propanediol tetrafluoroborate) terephthalate (P[BMIMP][BF$_4$]T) 8 and poly(2,2-Bis(butylimidazolium methyl)-1,3-propanediol tetrafluoroborate) terephthalate (P[BBIMP][BF$_4$]T) 9, is shown in Scheme 8. Triethylamine was added to the reaction system slowly to remove the hydrogen chloride. The obtained three polymers (7, 8 and 9) are all white powders. But the solubilities of them are not as good as those for the corresponding PC types because their phenyl groups increase the rigidity of the polymer chains greatly. Because they are only soluble in solvents with strong polarity and high boiling points, such as DMSO and DMF, it is difficult to fabricate them into membranes using the solvent evaporation method.

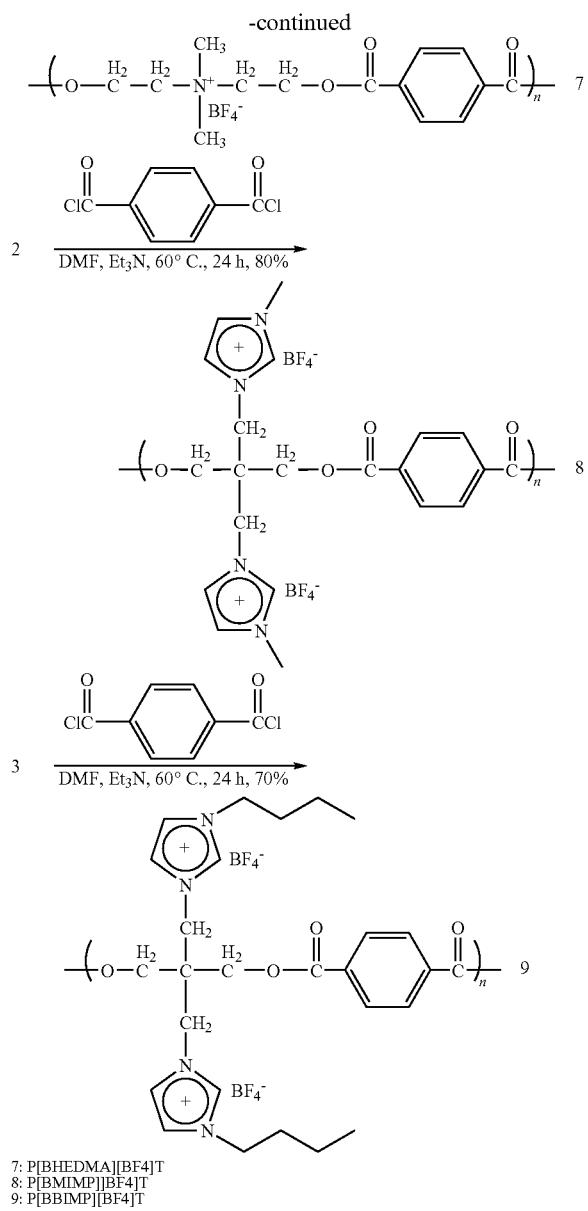

7: P[BHEDMA][BF4]T
8: P[BMIMP][BF4]T
9: P[BBIMP][BF4]T

EXAMPLE 4

Poly(ionic liquid) Membranes for $CO_2/CH_4$ and $CO_2/N_2$ Separations[31]

Figure 16:
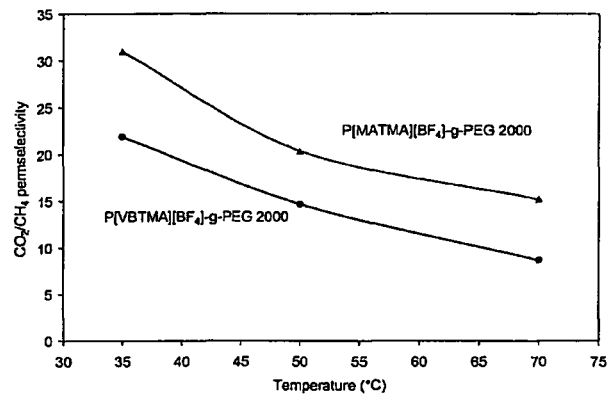
FIG. 16 is a graphical representation of the $CO_2/CH_4$ selectivity for P[VBTMA][$BF_4$]-co-PEG and P[MATMA][$BF_4$]-co-PEG.
Figure 17:
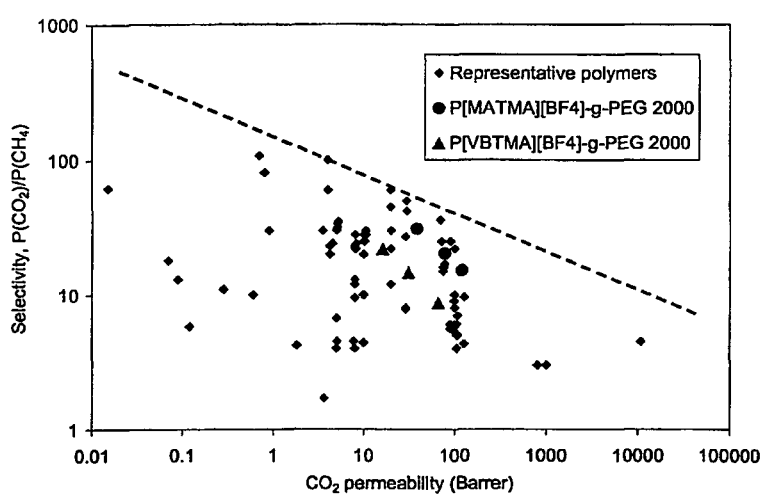
FIG. 17 is a graphical representation of the $CO_2/CH_4$ selectivity for representative polymers and poly(ionic liquids) (◆: representative polymers; ●: P[MATMA][$BF_4$]-co-PEG at 35° C., 50° C. and 70° C.; ▲: P[VBTMA][$BF_4$]-co-PEG at 35° C., 50° C. and 70° C.)
Figure 18:
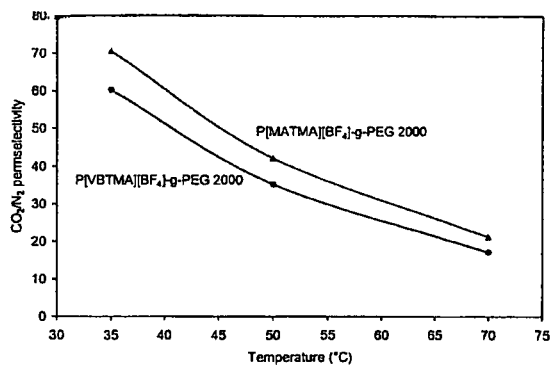
FIG. 18 is a graphical representation of the $CO_2/N_2$ selectivity for P[VBTMA][$BF_4$]-co-PEG and P[MATMA][$BF_4$]-co-PEG
Figure 19:
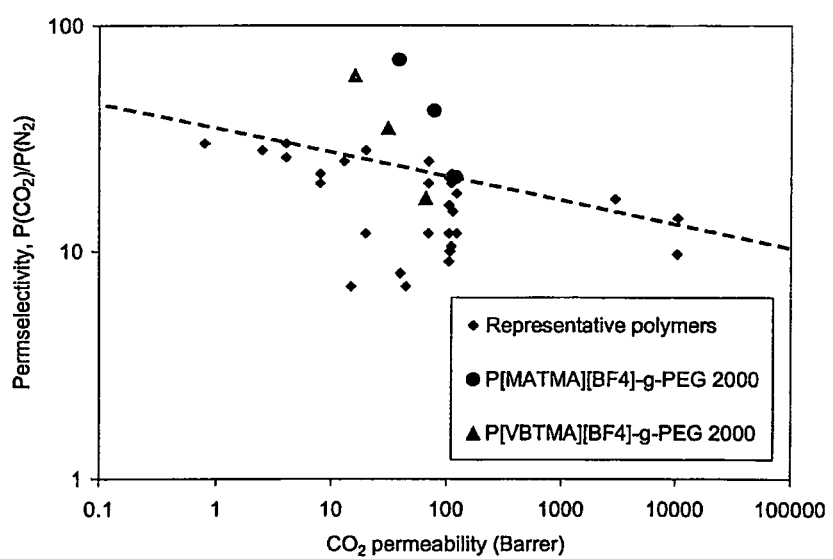
FIG. 19 is a graphical representation of the $CO_2/N_2$ selectivity for representative polymers and poly(ionic liquids) (◆: representative polymers; ●: P[MATMA][$BF_4$]-co-PEG at 35° C., 50° C. and 70° C.; ▲: P[VBTMA][$BF_4$]-co-PEG at 35° C., 50° C. and 70° C.)

Copolymers of ionic liquid and polyethylene glycol (PEG), for example P[VBTMA][BF$_4$]-co-PEG and P[MATMA][BF$_4$]-co-PEG were synthesized as follows: Ionic liquid monomer ([VBTMA][BF$_4$] or [MATMA][BF$_4$]) (2 gram), poly(ethylene glycol)methyl ether methacrylate (Mn=2000) (2 g), AIBN (40 mg) and DMF (8 ml) are charged into a reaction tube. The tube is tightly sealed, degassed, and immersed in an oil bath at 60° C. for 12 h to get complete polymerization. These copolymer solutions were used to cast membranes for $CO_2/CH_4$ and $CO_2/N_2$ separations at 35° C., 50° C. and 70° C., all at 40 psig. These membranes were tested for permeability and selectivity. FIG. 16 shows the $CO_2CH_4$ selectivity. FIG. 17 shows that our copolymers have better properties than the previously studied representative polymers for $CO_2/CH_4$ separation. FIG. 18 shows the selectivity of $CO_2/N_2$ for both P[VBTMA][BF$_4$]-co-PEG and P[MATMA][BF$_4$]-co-PEG at 35° C., 50° C. and 70° C. FIG. 19 illustrates that both P[VBTMA][BF$_4$]-co-PEG and P[MATMA][BF$_4$]-co-PEG membranes exhibit better ideal separation performance than the representative polymers because the data lie well above the upper limit bound curve, particularly for P[MATMA][BF$_4$]-co-PEG.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

References

1. Azar, C.; Rodhe, H. Science 1997, 276, 1818-1819.
2. Ruether, J. A. FETC Programs for Reducing Greenhouse Gas Emissions. Report No. DOE/EFTC-98/1058, U.S. Department of Energy: Pittsburgh, Pa., 1999.
3. DOE/OS-FE. Carbon sequestration. State of the Science; Office of Science and Office of Fossil Energy; U.S. Department of Energy: Washington, D.C., 1999.
4. U.S. Department of Energy. Carbon Sequestration-Research and Development; 1999. http://www.fe.doe.gov/coal_power/sequestration/reports/rd/index.html.
5. White, C. M.; Strazisar, B. R.; Granite, E. J. Hoffman; Pennline, H. W. J. Air & Waste Manage. Assoc. 2003, 53: 645-715
6. Huddleston, J. G.; Willauer, H. D.; Swatloski, R. P.; Rogers, R. D. Chem Commun 1998, 16, 1765-1766.
7. Wasserscheid, P.; Keim, W. Angew Chem Int Ed 2000, 39, 3772-3789.
8. Welton, T. Chem Rev 1999, 99, 2071-2084.
9. Rogers, R. D. and Seddon, K. R. (ed), Ionic Liquids as Green Solvents: Progress and Prospects, American Chemical Society: Washington, D.C., 2003.
10. Ding, J.; Zhou, D.; Spinks, G.; Wallace, G; Forsyth, S.; Forsyth, M.; MacFarlane, D. Chem. Mater 2003; 15, 2392-2398.
11. Liang, C.; Yuan, C-Y.; Warmack, R. J.; Barnes, C. E. and Dai, S. Anal Chem 2002, 74, 2172-2176.
12. Pernak, J.; Czepukowicz, A.; Poz'niak, R. Ind Eng Chem Res 2001, 40, 2379-2383.
13. Blanchard, L. A.; Hancu, D.; Beckmnan, E. J.; Brennecke, J. F. Nature 1999, 399, 28-29.
14. Blanchard, L. A.; Gu, Z. Y.; Brennecke, J. F. J Phys Chem B 2001, 105, 2437-2444.
15. Blanchard, L. A.; Brennecke, J. F. Ind Eng Chem Res 2001, 40, 287-292.
16. Anthony, J. L.; Maginn, E. J.; Brennecke, J. F. J Phys Chem B 2002, 106, 7315-7320.
17. Kamps, A. P.-S.; Tuma, D.; Xia, J.; Maurer, G. J Chem Eng Data 2003, 48, 746-749.
18. Husson-Borg, P.; Majer, V.; Costa Gomes, M. F. J Chem Eng Data 2003, 48, 480-485.
19. Cadena, C.; Anthony, J. L.; Shah, J. K.; Morrow, T. I.; Brennecke, J. F. and Maginn, E. J. J Am Chem Soc 2004, 126, 5300-5308.

20. Scovazzo, P., Camper, D.; Kieft, J.; Poshusta, J.; Koval, C.; Noble, R. D. Ind Eng Chem Res 2004, 43, 6855-6860.
21. Camper, D.; Scovazzo, P.; Koval, C.; Noble, R. D. Ind Eng Chem Res 2004, 43, 3049-3054.
22. Baltus, R. E.; Culbertson, B. H.; Dai, S.; Luo, H.; DePaoli, D. W. J Phys Chem B 2004, 108, 721-727
23. Bates, E. D.; Mayton, R. D.; Ntai, I.; Davis Jr., J. H. J Am Chem Soc 2002, 124, 926.
24. Scovazzo, P.; Kieft, J.; Finan, D. A.; Koval, C.; DuBois, D. L.; Noble, R. D. J Memb Sci 2004, 238, 57-63;
25. Scovazzo, P.; Visser, A. E.; Davis, J. H., Jr.; Rogers, R. D.; Koval, C. A.; DuBois, D. L.; Noble, R. D. ACS Symp Ser 2002, 818, 69-87;
26. Fortunato, R.; Afonso, C. A. M.; Reis, M. A. M.; Crespo, J. G. J Memb Sci 2004, 242, 197-209.
27. Ding, S.; Tang, H. Radosz, M.; Shen, Y. J Polym Sci Part A: Poly Chem 2004, 42, 5794-5801.
28. Tang, H.; Tang, J.; Radosz, M.; Shen, Y. J Polym Sci Part A: Poly Chem 2005, 43, 1432-1443.
29. Macedonia, M. D.; Moore, D. D. and Maginn, E. J. Langmuir 2000, 16, 3823-3834
30. Tang, J. B.; Sun, W. L.; Tang, H. D. Radosz, M.; Shen, Y. Chem. Commun. 2005, 3325-3327.
31. Hu, X.; Tang, J.; Blasig, A.; Shen, Y.; Radosz, M. J. Membrane Science 2005, in preparation.

We claim:
1. A process for the separation of a gas, comprising the steps of:
   (a) contacting a mixture containing the gas with a solid sorbent comprising at least one poly(ionic liquid) compound under such conditions as to obtain a product having a lower concentration of the gas than the mixture and a solid sorbent containing absorbed gas which has been removed from the mixture; and
   (b) treating the solid sorbent under conditions as to substantially desorb the gas contained in the solid sorbent so as to obtain a regenerated solid sorbent wherein the treatment step is one or more steps selected from the group consisting of heating, depressurizing, and displacing the gas.
2. A process as defined in claim 1, wherein the gas is carbon dioxide.
3. A process for the separation of carbon dioxide, comprising the step of contacting a gas mixture containing carbon dioxide with a membrane comprising at least one poly(ionic liquid) compound under such conditions as to obtain a $CO_2$-rich gas product that permeates through the membrane and a $CO_2$-lean gas product that does not permeate through the membrane.

* * * * *